(12) United States Patent
Kitaoka et al.

(10) Patent No.: US 6,819,646 B1
(45) Date of Patent: Nov. 16, 2004

(54) OPTICAL PICKUP, OPTICAL INFORMATION RECORDING/ REPRODUCING APPARATUS USING THE SAME, AND PHASE VARIABLE WAVE PLATE USED IN THE PICKUP AND THE APPARATUS

(75) Inventors: Yasuo Kitaoka, Osaka (JP); Ken'ichi Kasazumi, Osaka (JP); Katsuhiko Kumagawa, Osaka (JP); Kazuhisa Yamamoto, Osaka (JP); Hidenori Wada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/484,969

(22) Filed: Jan. 18, 2000

(30) Foreign Application Priority Data

Jan. 19, 1999 (JP) .......................................... 11-011209

(51) Int. Cl.$^7$ ................................................. G11B 7/00
(52) U.S. Cl. ................................. 369/112.01; 369/121
(58) Field of Search ........................ 369/112.01, 112.02, 369/112.16, 112.18, 112.22, 112.21, 121, 124.03, 112.27

(56) References Cited

U.S. PATENT DOCUMENTS 5,734,637 A    3/1998   Ootaki et al.
5,901,131 A    5/1999   Ootaki et al.

FOREIGN PATENT DOCUMENTS

| JP | 9-304748 | 11/1997 |
|---|---|---|
| JP | 10-83552 | 3/1998 |
| JP | 10-83560 | 3/1998 |
| JP | 10090521 A * | 4/1998 |

OTHER PUBLICATIONS

Komma et al. "Dual Focus Optical Head for 0.6 mm and 1.2 mm Disks", *Optical Review*, vol. 1, No. 1, 1994, pp. 27–29.

* cited by examiner

*Primary Examiner*—Paul W. Huber
(74) *Attorney, Agent, or Firm*—Merchant & Gould P.C.

(57) ABSTRACT

Laser beams respectively emitted from a SHG blue laser unit and a red semiconductor laser unit that have photo detectors respectively are turned into parallel lights by a collimator lens and then coupled by a dielectric multi-layer film mirror so as to be propagated on the same optical axis. The dielectric multi-layer film mirror is configured so as to transmit light with a wavelength of 500 nm or shorter and reflect light with a wavelength of 500 nm or longer for both P wave and S wave. The lights that are transmitted and reflected by the dielectric multi-layer film mirror pass through a polarizing hologram and a phase variable wave plate and are focused on an optical disk by an objective lens. In this manner, a simple configuration can realize a compatibility with many types of optical disks and a stable signal detection even when using a polarizing optical detection system.

4 Claims, 21 Drawing Sheets

(a) M1

(b) M3

(a) axis C (direction of extraordinary light)

(b) voltage V = 0

(c) voltage V = V1

voltage V = 0

(a)

(b)

voltage V = 0

OPTICAL PICKUP, OPTICAL INFORMATION RECORDING/ REPRODUCING APPARATUS USING THE SAME, AND PHASE VARIABLE WAVE PLATE USED IN THE PICKUP AND THE APPARATUS

FIELD OF THE INVENTION

The present invention relates to an optical pickup that is provided with a plurality of light sources emitting light beams with different wavelengths (for example, semiconductor lasers), an optical information recording/reproducing apparatus using the same, and a phase variable wave plate used in the pickup and the apparatus.

BACKGROUND OF THE INVENTION

In 1996, a DVD (digital versatile disk) system having a recording capacity of 4.7 GB was developed by using an AlGaInP red semiconductor laser (a wavelength of approximately 650 nm). A conventional CD (compact disk) system had used an AlGaAs near infrared semiconductor laser (a wavelength of approximately 780 nm) and had a recording capacity of 650 MB.

There are many points differentiating the DVD system from the CD system. One of them is the base material thickness of an optical disk used. Specifically, the base material thickness of the optical disk is 1.2 mm in the CD system, while it is 0.6 mm in the DVD system. Accordingly, in order to obtain a compatibility with the CD system, various methods are being suggested in the DVD system.

One of them is a configuration using a bifocal lens (for example, see "Optical Review," Vol. 1, No. 1, pages 27–29 (1997)).

The bifocal lens is a lens in which concentric circular hologram elements are formed on an objective lens with a numerical aperture NA of 0.6 designed for the 650 nm wavelength. This bifocal lens can separate light that is focused without aberration on a CD with a base material thickness of 1.2 mm by using a+first order light of the hologram element from light that is focused without aberration on a DVD with a base material thickness of 0.6 mm by using the usual objective lens (a zeroth-order light of the hologram element), thereby achieving the compatibility between the CD and the DVD.

However, although the optical system using the bifocal lens realizes the compatibility with the CD, it cannot yet achieve that with a CD-R. This is because a sufficient reproducing signal cannot be obtained due to the rather poor reflective properties of the CD-R in the red region. Thus, an optical pickup having two integrated units 125 and 126 (wavelengths of 650 nm and 780 nm) as shown in FIG. 21 is suggested.

In the configuration shown in FIG. 21, a laser beam with a wavelength of 650 nm emitted from the integrated unit 125 for DVD passes through a wavelength branching prism 127, a polarizing hologram 128 (diffraction gratings are formed on a LiNbO$_3$ substrate by a proton exchange) and a wave plate 129 (a (5/4) λ plate for 650 nm wavelength), and then is focused on an optical disk (DVD-ROM) 131 by an objective lens 132. The light reflected by the optical disk 131 enters the wave plate 129 by which a polarization direction thereof is rotated by 90° from that of an incident light, is diffracted by the polarizing hologram 128 and is imaged on a photo detector (PD) in the integrated unit 125 for DVD. In this optical detection system, the focusing direction is controlled by a SSD (spot size detection) method, and the tracking direction is controlled by a phase difference detection method.

On the other hand, a laser beam with a wavelength of 780 nm emitted from the integrated unit 126 for CD passes through a plastic hologram element 126b with a narrow pitch and is reflected by the wavelength branching prism 127. Then, as the laser beam with a wavelength of 650 nm from the integrated unit 125 for DVD, it passes through the polarizing hologram 128 and the wave plate 129, and is focused on an optical disk (CD or CD-R) 130 by the objective lens 132. The light reflected by the optical disk 130 passes through the wave plate 129 and the polarizing hologram 128 again. In this case, since the wave plate 129 functions as a λ plate for 780 nm wavelength, the polarization direction is maintained and not diffracted by the polarizing hologram 128. The light reflected by the wavelength branching prism 127 and then diffracted by the plastic hologram element 126b is imaged on a photo detector (PD) in the integrated unit 126 for CD. In this optical detection system, the focusing direction is controlled by the SSD method, and the tracking direction is controlled by a three-beam method.

The objective lens 132 is designed so that the 780 nm wavelength light causes small aberration for the optical disk (CD or CD-R) 130 with a base material thickness of 1.2 mm and the 650 nm wavelength light causes small aberration for the optical disk (DVD-ROM) 131 with a base material thickness of 0.6 mm.

With the optical pickup having the above configuration, the optical disk (CD or CD-R) 130 with a base material thickness of 1.2 mm is reproduced by the laser beam with a wavelength of 780 nm emitted from the integrated unit 126 for CD, and the optical disk (DVD-ROM) 131 with a base material thickness of 0.6 mm is reproduced by the laser beam with a wavelength of 650 nm emitted from the integrated unit 125 for DVD, thereby obtaining excellent reproducing properties.

The recording capacity of a current DVD is 4.7 GB, and approximately two hours of NTSC (National Television System Commitee standard) broadcast data can be recorded. However, in order to develop media for image data of a high-vision or a high-definition (generally referred to as "HD" in the following), it is essential to further improve the recording density of the optical disks.

As means for improving the recording density of the optical disks, (1) changing a light source so as to produce a shorter wavelength and (2) increasing the numerical aperture NA of the objective lens can be considered. However, making the numerical aperture NA of the objective lens larger than the current value of 0.6 is difficult both from the viewpoints of margins on systems and of compatibility with the CDs and the DVDs.

On the other hand, the light source can be changed so as to produce a shorter wavelength by using a second harmonic generation (SHG) technique of a near infrared semiconductor laser or by using a GaN semiconductor laser. The use of blue light with a wavelength of approximately 400 nm can improve the recording density by approximately 2.3 times over the current DVD. In the following, the DVD that is obtained as above will be referred to as "HD-DVD".

Also in the era of HD-DVDs using blue light, it is important to obtain compatibility with the DVDs and the CDs. In line with the CD-R, a pigment-type DVD-R is currently being developed. However, the reflective properties of the CD-Rs and the DVD-Rs deteriorate in the blue region. Therefore, in order to achieve compatibility, an optical pickup that is provided with coherent light sources respectively emitting lights in three wavelength regions of blue region, red region and infrared region is necessary.

However, since the optical pickup that is configured with the coherent light sources of multiple wavelengths necessitates many optical components, it is difficult to design an optical pickup that can be mass-produced on a practical level. For example, problems described below are caused.

(1) Due to the increase of the number of the optical components, higher precision in aberration of respective optical components becomes necessary, and integration thereof becomes difficult, leading to the difficulty in designing a small-size (thin) optical pickup, and (2) Since it is necessary to simultaneously achieve the optical detection systems corresponding to respective lights of multiple wavelengths, the configuration of a 1/4 wave plate becomes complex when using a polarizing hologram element and a polarization branching element in the optical detection systems.

SUMMARY OF THE INVENTION

It is an object of the present invention to solve the above-mentioned problems of the prior art and to provide a small-size optical pickup that, with a simple configuration, achieves compatibility between multiple types of optical disks and stable signal detection even when using a polarizing optical detection system, an optical information recording/reproducing apparatus using the same, and a phase variable wave plate used in the pickup and the apparatus.

In order to achieve the object mentioned above, the first configuration of the optical pickup according to the present invention is characterized in that the optical pickup includes two coherent light sources respectively emitting light beams with different wavelengths ($\lambda_1 < \lambda_1$), a light coupling member, and a wave plate. The light beams emitted from the two coherent light sources are coupled by the light coupling member so as to be propagated on the same optical axis, pass through the wave plate, and are then focused on an optical disk, and a retardation amount $\lambda$ of the wave plate is in the range $3/4 \cdot \lambda_2 < \lambda < 5/4 \cdot \lambda_1$. The first configuration can provide the optical pickup in which a simple configuration can achieve a compatibility with many types of optical disks and a stable signal detection even when using a polarizing optical detection system.

The second configuration of the optical pickup according to the present invention is characterized in that the optical pickup includes two coherent light sources respectively emitting light beams with different wavelengths ($\lambda_1 < \lambda_2$), a light coupling member, and a wave plate. The light beams emitted from the two coherent light sources are coupled by the light coupling member so as to be propagated on the same optical axis, pass through the wave plate, and then are focused on an optical disk, and a retardation amount $\lambda$ of the wave plate is substantially an uneven integer multiple of $\lambda_1/4$ and substantially an uneven integer multiple of $\lambda_2/4$. The second configuration can provide an optical pickup in which a simple configuration can realize a compatibility with many types of optical disks and a stable signal detection even when using a polarizing optical detection system.

In the second configuration of the optical pickup according to the present invention, it is preferable that the wave plate is made of a birefringent material with large wavelength dispersion, and the retardation amount $\lambda$ of the wave plate is $(2n+3)$ times $\lambda_1/4$ for the light beam with the wavelength $\lambda_2$ and is $(2n+1)$ times $\lambda_2/4$ for the light beam with the wavelength $\lambda_2$, wherein n=0, 1, 2, . . . . With this preferred example, a wave plate that, for example, converts a linear polarization to a circular polarization for both red light (wavelength of 690 nm) and blue light (wavelength of 380 nm) can be manufactured.

In the first or second configuration of the optical pickup according to the present invention, it is preferable that the wavelengths of the two coherent light sources are in the ranges 370 nm<$\lambda_1$<430 nm and 635 nm<$\lambda_2$<690 nm.

The third configuration of the optical pickup according to the present invention is characterized in that the optical pickup includes n coherent light sources emitting light beams with different wavelengths ($\lambda_1 < \lambda_2 < \ldots < \lambda_n$) wherein n>2, and (n−1) light coupling members. The light beam with the wavelength $\lambda_1$ passes through all (n−1) light coupling members, and the light beams with other wavelengths are respectively reflected by the light coupling members that are disposed corresponding to the coherent light sources emitting the light beams, so that all the light beams with different the wavelengths are coupled so as to be propagated on the same optical axis. The third configuration of the optical pickup can achieve an optical pickup with small aberration for every wavelength light.

The fourth configuration of the optical pickup according to the present invention is characterized in that the optical pickup includes a plurality of coherent light sources emitting light beams with different wavelengths ($\lambda_1 < \lambda_2 < \ldots$) and with which optical detection systems for detecting a reflected beam from an optical disk are provided, a light coupling member, and a phase variable wave plate. At least one of the optical detection systems includes a polarization branching member. The light beams emitted from the plurality of coherent light sources are coupled by the light coupling member so as to be propagated on the same optical axis, pass through the phase variable wave plate and are then guided to the optical disk. A principal crystal axis of the phase variable wave plate and a radial direction of the optical disk are in parallel or perpendicular to each other. A polarization direction of the coupled light beam is inclined by 45° with respect to the radial direction of the optical disk. With the fourth configuration of the optical pickup, a single phase variable wave plate can have functions both as a 1/4 wave plate and of compensating for a birefringence amount generated in the optical disk.

In the first to fourth configurations of the optical pickup according to the present invention, it is preferable that the light coupling member is a dielectric multi-layer film mirror. This preferred example can improve the efficiency of light utilization.

The fifth configuration of the optical pickup according to the present invention is characterized in that the optical pickup includes a plurality of coherent light sources that are mounted on the same submount and emit light beams with different wavelengths ($\lambda_1 < \lambda_2 < \ldots$), and a collimator lens converting all the light beams with the different wavelengths into parallel beams. The fifth configuration of this optical pickup has one collimator lens, which converts the light beams emitted from the light sources into parallel beams, thereby simplifying the adjustment of the collimator lens.

In the fifth configuration of the optical pickup according to the present invention, it is preferable that the coherent light source emitting the light beam with the wavelength $\lambda_1$ is mounted on the submount in a position corresponding to a center of an optical axis of the collimator lens. This preferred example can achieve an optical pickup with small aberration for every wavelength light.

The sixth configuration of the optical pickup according to the present invention is characterized in that the optical pickup includes a plurality of coherent light sources emitting light beams with different wavelengths ($\lambda_1 < \lambda_2 < \ldots$) and with which optical detection systems for detecting a reflected beam from an optical disk are provided, and a phase variable wave plate. At least one of the optical detection systems includes a polarization branching member, and the phase variable wave plate is located behind the polarization branching member. With the sixth configuration of this optical pickup, even when at least one of the optical detection systems includes a polarization branching member, a constant light quantity guided onto the photo detectors can be maintained.

The seventh configuration of the optical pickup according to the present invention is characterized in that the optical pickup includes a plurality of coherent light sources emitting light beams with different wavelengths ($\lambda_1 < \lambda_2 < \ldots$) and with which optical detection systems for detecting a reflected beam from an optical disk are provided, and a phase variable wave plate. The phase variable wave plate includes two liquid crystal layers with different wavelength dispersion relationships of refractive index, the two liquid crystal layers are oriented perpendicularly to each other, and phase differences $\phi$ that are obtained by the phase variable wave plate are $\phi_n < \phi_{n+1}$ for wavelengths $\lambda_n < \lambda_{n+1}$. The seventh configuration of this optical pickup can achieve the phase variable wave plate that functions as substantially a 1/4 wave plate for every wavelength light and a stable signal detection even when using a polarizing optical detection system. Also, since adjusting a voltage applied to the liquid crystal layer enables a fine adjustment of the properties, the phase variable wave plate can function as the 1/4 wave plate in a stable manner even when an environmental temperature changes.

In the fourth or sixth configuration of the optical pickup according to the present invention, it is preferable that the phase variable wave plate includes two liquid crystal layers with different wavelength dispersion relationships of refractive index, the two liquid crystal layers are oriented perpendicularly to each other, and phase differences $\phi$ that are obtained by the phase variable wave plate are $\phi_n < \phi_{n+1}$ for wavelengths $\lambda_n < \lambda_{n+1}$.

The eighth configuration of the optical pickup according to the present invention is characterized in that the optical pickup includes a plurality of coherent light sources emitting light beams with different wavelengths ($\lambda_1 < \lambda_2 < \ldots$) and with which optical detection systems for detecting a reflected beam from an optical disk are provided, and a phase variable wave plate. The phase variable wave plate includes a combination of a liquid crystal layer and a film with different wavelength dispersion relationships of refractive index, the liquid crystal layer and the film are oriented perpendicularly to each other, and phase differences $\phi$ that are obtained by the phase variable wave plate are $\phi_n < \phi_{n+1}$ for wavelengths $\lambda_n < \lambda_{n+1}$. The eighth configuration of this optical pickup can achieve the phase variable wave plate that functions as substantially a 1/4 wave plate for every wavelength light and a stable signal detection even when using a polarizing optical detection system. Also, since adjusting a voltage applied to the liquid crystal layer enables a fine adjustment of the properties, the phase variable wave plate can function as the 1/4 wave plate in a stable manner even when an environmental temperature changes. Furthermore, the voltage applied to the phase variable wave plate can be reduced, thereby providing a still more practical device.

In the fourth or sixth configuration of the optical pickup according to the present invention, it is preferable that the phase variable wave plate includes a combination of a liquid crystal layer and a film with different wavelength dispersion relationships of refractive index, the liquid crystal layer and the film are oriented perpendicularly to each other, and phase differences $\phi$ that are obtained by the phase variable wave plate are $\phi_n < \phi_{n+1}$ for wavelengths $\lambda_n < \lambda_{n+1}$.

In the third to eighth configurations of the optical pickup according to the present invention, it is preferable that the plurality of coherent light sources are three coherent light sources respectively emitting light beams with the different wavelengths ($\lambda_1 < \lambda_2 < \lambda_3$), and the wavelengths of the three coherent light sources are in the ranges 370 nm $< \lambda_1 <$ 430 nm, 635 nm $< \lambda_2 <$ 690 nm and 760 nm $< \lambda_3 <$ 810 nm.

In the fourth, sixth or seventh configuration of the optical pickup according to the present invention, it is preferable that the phase variable wave plate includes a liquid crystal layer, whose birefringence is changed by adjusting a voltage applied to the liquid crystal layer.

In the first to eighth configurations of the optical pickup according to the present invention, it is preferable that the optical pickup further includes a variable phase plate that is divided into regions of concentric rings and inserted in an optical path between the coherent light source and the optical disk, and an objective lens for focusing the light beams with the different wavelengths emitted from the coherent light sources on the optical disk. The variable phase plate compensates for spherical aberration caused by the objective lens. This preferred example can achieve excellent focusing properties.

The first configuration of the optical information recording/reproducing apparatus according to the present invention is characterized in that the optical information recording/reproducing apparatus includes an optical pickup including a plurality of coherent light sources emitting light beams with different wavelengths ($\lambda_1 < \lambda_2 < \ldots$) and with which optical detection systems for detecting a reflected beam from an optical disk are provided, and a phase variable wave plate. At least one of the optical detection systems includes a polarization branching member, and the phase variable wave plate is located behind the polarization branching member. With respect to the light beams emitted from the coherent light sources with which the optical detection systems including the polarization branching member are provided, photo detectors included in the optical detection systems detect a light quantity of the reflected beams from the optical disk after passing through the polarization branching member, and a phase modulation of the phase variable wave plate is adjusted based on a detection result of the photo detectors, thereby controlling the light quantity of the reflected beams after passing through the polarization branching member. The first configuration of this optical information recording/reproducing apparatus can maintain a constant light quantity that is guided onto photo detectors included in the optical detection systems, thereby achieving a stable signal detection.

The second configuration of the optical information recording/reproducing apparatus according to the present invention is characterized in that the optical information recording/reproducing apparatus includes an optical pickup including a plurality of coherent light sources emitting light beams with different wavelengths ($\lambda_1 < \lambda_2 < \ldots$) and with which optical detection systems for detecting a reflected beam from an optical disk are provided, and a phase variable wave plate. At least one of the optical detection systems includes a polarization branching member. With respect to the light beams emitted from the coherent light sources with which the optical detection systems including the polarization branching member are provided, the sum of a phase modulation of the phase variable wave plate and a phase modulation generated in the optical disk for incident path is controlled so as to be $n\pi/4$, wherein n=1, 3, 5, 7, . . . With the second configuration of this optical information recording/reproducing apparatus, the reflected lights from the optical disk are converted into linearly polarized lights in which the polarization directions thereof are rotated by 90° from the initial directions after passing through the phase variable wave plate. In other words, the phase modulation is controlled so that the largest light quantity is guided onto the photo detectors, thereby providing a servo operation and signal detection in a stable manner.

The third configuration of the optical information recording/reproducing apparatus according to the present invention is characterized in that the optical information recording/reproducing apparatus includes an optical pickup including a plurality of coherent light sources emitting light beams with different wavelengths ($\lambda_1<\lambda_2<$ . . . ) and with which optical detection systems for detecting a reflected beam from an optical disk are provided, and a phase variable wave plate. At least one of the optical detection systems includes a polarization branching member. With respect to the light beams emitted from the coherent light sources with which the optical detection systems including the polarization branching member are provided, the phase variable wave plate is controlled so as to function as a 1/4 wave plate. The third configuration of this optical information recording/ reproducing apparatus can maintain a constant light quantity that is guided to the optical detection systems including the polarization branching member to a certain extent, thereby achieving a stable signal detection.

In the first to third configurations of the optical information recording/reproducing apparatus according to the present invention, it is preferable that the phase variable wave plate includes two liquid crystal layers with different wavelength dispersion relationships of refractive index, the two liquid crystal layers are oriented perpendicularly to each other, and phase differences $\phi$ that are obtained by the phase variable wave plate are $\phi_n<\phi_{n+1}$ for wavelengths $\lambda_n<\lambda_{n+1}$.

In the first to third configurations of the optical information recording/reproducing apparatus according to the present invention, it is preferable that the phase variable wave plate includes a combination of a liquid crystal layer and a film with different wavelength dispersion relationships of refractive index, the liquid crystal layer and the film are oriented perpendicularly to each other, and phase differences $\phi$ that are obtained by the phase variable wave plate are $\phi_n<\phi_{n+1}$ for wavelengths $\lambda_n<\lambda_{n+1}$.

In the first to third configurations of the optical information recording/reproducing apparatus according to the present invention, it is preferable that the plurality of coherent light sources are three coherent light sources respectively emitting light beams with the different wavelengths ($\lambda_1<\lambda_2<\lambda_3$), and the wavelengths of the three coherent light sources are in the ranges 370 nm<$\lambda_1$<430 nm, 635 nm<$\lambda_2$<690 nm and 760 nm<$\lambda_3$<810 nm.

In the first to third configurations of the optical information recording/reproducing apparatus according to the present invention, it is preferable that the phase variable wave plate includes a liquid crystal layer, whose birefringence is changed by adjusting a voltage applied to the liquid crystal layer.

In the first to third configurations of the optical information recording/reproducing apparatus according to the present invention, it is preferable that the optical information recording/reproducing apparatus further includes a variable phase plate that is divided into regions of concentric rings and inserted in an optical path between the coherent light source and the optical disk, and an objective lens for focusing the light beams with the different wavelengths emitted from the coherent light sources on the optical disk. The variable phase plate compensates for spherical aberration caused by the objective lens.

The first configuration of the phase variable wave plate according to the present invention is characterized in that the phase variable wave plate including two liquid crystal layers with different wavelength dispersion relationships of refractive index. The two liquid crystal layers are oriented perpendicularly to each other, and phase differences $\phi$ that are obtained are $\phi_n<\phi_{n-1}$ for wavelengths $\lambda_n<\lambda_{n+1}$.

The second configuration of the phase variable wave plate according to the present invention is characterized in that the phase variable wave plate including a combination of a liquid crystal layer and a film with different wavelength dispersion relationships of refractive index. The liquid crystal layer and the film are oriented perpendicularly to each other, and phase differences $\phi$ that are obtained are $\phi_n<\phi_{n-1}$ for wavelengths $\lambda_n<\lambda_{n+1}$.

BRIEF DESCRIPTION OF THE DRAWINGS

FIG. 14 shows a diagram of a variable wave plate used in the optical pickup in accordance with the fourth embodiment of the present invention.

DESCRIPTION OF THE PREFERRED EMBODIMENTS

The following is a specific description of the preferred embodiments in accordance with the present invention.
First Embodiment In the present embodiment, an optical pickup that is provided with coherent light sources respectively emitting lights in two wavelength regions of a blue region and a red region and has an optical detection system using a polarizing hologram element and a wave plate is described.

Figure 1:
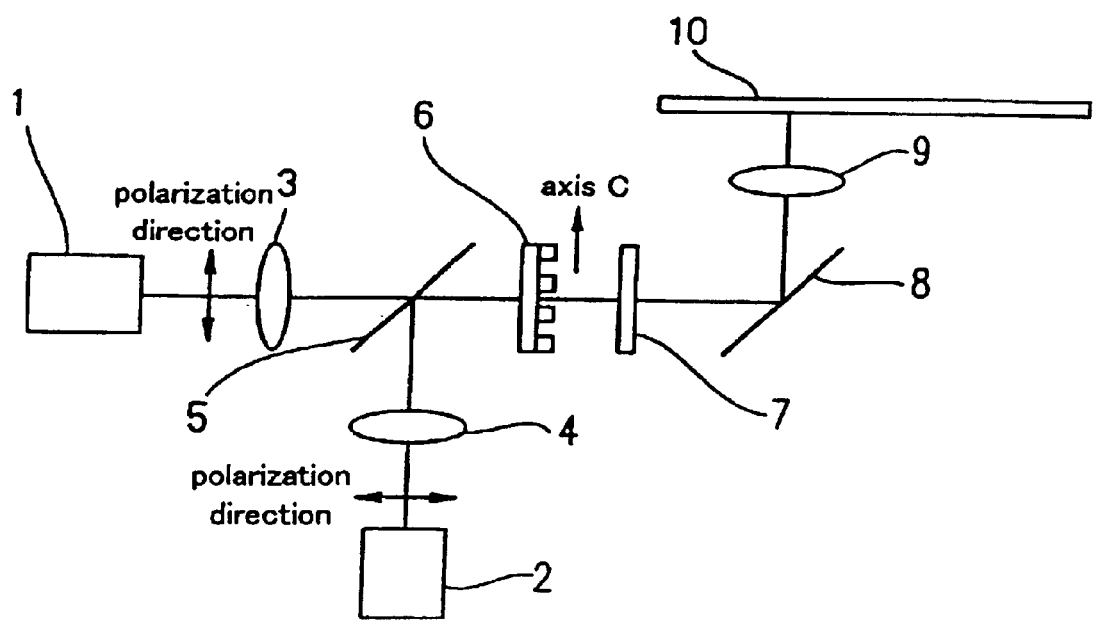
FIG. 1 shows a schematic diagram of an optical pickup in accordance with a first embodiment of the present invention.

FIG. 1 shows a schematic diagram of the optical pickup in accordance with a first embodiment of the present invention.

Figure 2:
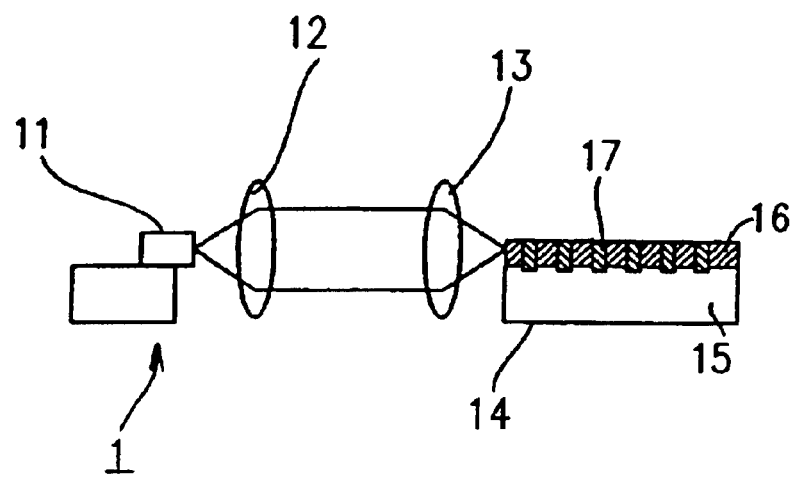
FIG. 2 shows a schematic diagram of a SHG blue laser unit used in the optical pickup in accordance with the first embodiment of the present invention.

The present embodiment uses a SHG blue laser unit 1 using a second harmonic generation (SHG) technique as the coherent light source in the blue region. FIG. 2 shows a configuration of the SHG blue laser unit 1. The SHG blue laser unit 1 includes a near infrared semiconductor laser and an optical waveguide wavelength-converting element.

In the configuration shown in FIG. 2, a distributed Bragg reflecting (DBR) semiconductor laser 11 in which the wavelength can be varied is used as the near infrared semiconductor laser. The DBR semiconductor laser 11 includes an active region and a DBR region respectively having electrodes that are independent of each other. The emission wavelength of the DBR semiconductor laser 11 is 810 nm and the output thereof is 50 mW.

On the other hand, a quasi-phase-matching (QPM) domain-inverted optical waveguide device 14 in which periodically domain-inverted regions 17 and proton exchange optical waveguides (referred to as "optical waveguides" in the following) 16 are formed on 5 mol % Mg doped $LiNbO_3$ substrate 15 is used as the optical waveguide wavelength-converting element.

A laser beam emitted from the DBR semiconductor laser 11 is directed into the optical waveguide 16 by a collimator lens 12 and a focus lens 13, and 3 mW of blue light (wavelength of 405 nm) can be obtained as an output light of the optical waveguide 16 for a 50 mW output of the DBR semiconductor laser 11. The flare angle of the beam is 13.2° in a vertical direction and 5.7° in a horizontal direction.

In the present embodiment, an AlGaInP red semiconductor laser unit 2 is used as the coherent light source in the red region. The emission wavelength of the red semiconductor laser unit 2 is 670 nm and the operating current at the thresholds of 76 mA and 5 mW is 90 mA.

The following is a detailed description of a configuration of the optical pickup according to the present embodiment, with reference to FIG. 1.

Laser beams emitted from the SHG blue laser unit 1 and the red semiconductor laser unit 2 that have photo detectors respectively are turned into parallel lights by collimator lenses 3 and 4 and coupled by a dielectric multi-layer film mirror 5 as a light coupling member, so as to be propagated on the same optical axis. In the present embodiment, the dielectric multi-layer film mirror 5 is used as the light coupling member, but a diffraction grating or the like can be used to propagate the laser beams on the same optical axis. However, considering the efficiency for light utilization, it is desirable that the dielectric multi-layer film mirror 5 is used. The dielectric multi-layer film mirror 5 is configured so as to transmit light with a wavelength of 500 nm or shorter and reflect light with a wavelength of 500 nm or longer for both P wave and S wave. The light transmitted and reflected by the dielectric multi-layer film mirror 5 passes through a polarizing hologram 6 and a wave plate 7, is bent in the direction perpendicular to the face of the paper by a mirror 8 for bending an optical path (illustrated as being bent upward in FIG. 1) and is focused on an optical disk 10 by an objective lens 9.

The polarizing hologram 6 is configured by forming gratings on a $LiNbO_3$ substrate by a proton exchange ($\delta n=0.04$) and by etching (a depth of 100 $\mu$m). The pitch of the gratings is set to 8 $\mu$m (=Λ) here. Since the proton exchange increases the refractive index of extraordinary light and decreases that of ordinary light, etching the proton exchange region to reduce the thickness thereof compensates for the change of the refractive index of the extraordinary light, thus forming the gratings that are sensitive only to the ordinary light. For this purpose, the polarizing hologram 6 is placed so that the polarization direction of incident light is parallel to the direction of extraordinary light (an axis C direction or a principal crystal axis). The polarization direction is shown in FIG. 1.

The wave plate 7 is designed so that a phase modulation (retardation amount) of $\lambda$ is obtained for 504 nm wavelength ($3/4 \cdot \lambda_2 < \lambda < 5/4 \cdot \lambda_1$) light. Therefore, the wave plate 7 functions as a 5/4 wave plate (506 nm) for blue light (wavelength $\lambda_1$) and as a 3/4 wave plate (502 nm) for red light (wavelength $\lambda_2$). Accordingly, both the blue light and the red light are converted into circularly polarized light by the wave plate 7 and then focused on the optical disk 10 by the objective lens 9.

In other words, the retardation amount λ of the wave plate 7 is substantially an uneven integer multiple of $\lambda_1/4$ for blue light (wavelength $\lambda_1$) and is also substantially an uneven integer multiple of $\lambda_2/4$ for red light (wavelength $\lambda_2$). Therefore, the wave plate 7 functions as a 1/4 wave plate for both lights. In addition, the objective lens 9 is designed so that the blue and red lights cause small aberration.

The light reflected by the optical disk 10 passes through the objective lens 9 and the mirror 8 for bending the optical path again, and then is converted into linearly polarized light by the wave plate 7. Since the polarization direction of the reflected light is rotated by 90° from that of an incident light, the reflected light enters the polarizing hologram 6 in parallel to the ordinary light direction and is diffracted in $\theta(=\lambda/\Lambda)$ direction by the gratings of the polarizing hologram 6. The wave plate 7 functions as a 10/4 wave plate for blue light and as a 6/4 wave plate for red light between incident and return lights. In other words, it functions as a half-wave plate for both lights, so the polarization directions are rotated by 90° between incident and return lights. The diffraction efficiency of the polarizing hologram 6 was 60% for blue light and 50% for red light.

The blue light and the red light transmitted and reflected by the dielectric multi-layer film mirror 5 pass through the collimator lenses 3 and 4 respectively, and are focused on the photo detectors that are integrated in the respective laser units 1 and 2. The photo detectors detect a focus signal, a tracking servo signal and a RF signal. In this case, a three-divided photo detector performs the focus servo by a spot size detection method (referred to as "a SSD method" in the following), and a four-divided photo detector performs the tracking servo by a differential phase detection method. In the present embodiment, 50% or more of the light reflected by the optical disk 10 reaches the photo detector, enabling the stable servo operation and detection of the reproducing signal.

The wave plate 7 in accordance with the present embodiment can function as the 1/4 wave plate for both red and blue lights used in the DVDs and the HD-DVDs by setting a predetermined value to the thickness thereof. Providing such a wave plate 7 in an optical detection system that is configured using the polarizing hologram 6 as a polarization branching member can realize the stable servo operation and detection of the reproducing signal. Since this wave plate 7 easily can be manufactured by using quartz or the like as in the conventional manner, it is advantageous in a practical use.

The present embodiment uses the SHG blue laser unit 1 as the coherent light source in the blue region, but using a GaN blue semiconductor laser can achieve the similar effect.

The following is a description of a method for manufacturing the GaN blue semiconductor laser. First, an n-type GaN is grown on a SiC substrate. An n-type AlGaN/GaN superlattice cladding layer and an n-type GaN light guide layer, and then an InGaN multiple quantum well active layer are formed thereon. Subsequently, a p-type AlGaN layer, a p-type GaN light guide layer, a p-type AlGaN/GaN superlattice cladding layer and a p-type GaN layer are formed, followed by forming a p-type electrode thereon. Since the SiC substrate is electrically conductive, an n-type electrode is formed on the back surface of the substrate. This provides 5 mW of blue light (wavelength of 405 nm) for an operating current $I_{op}$=100 mA.

The optical pickup according to the present embodiment is provided with the light sources of blue light and red light respectively having the polarizing optical detection system, thereby leading light in a large light quantity to the photo detectors. Thus, the optical pickup according to the present embodiment can reproduce the DVD-Rs by red light and the HD-DVD-Rs by blue light in a stable manner.

Figure 3:
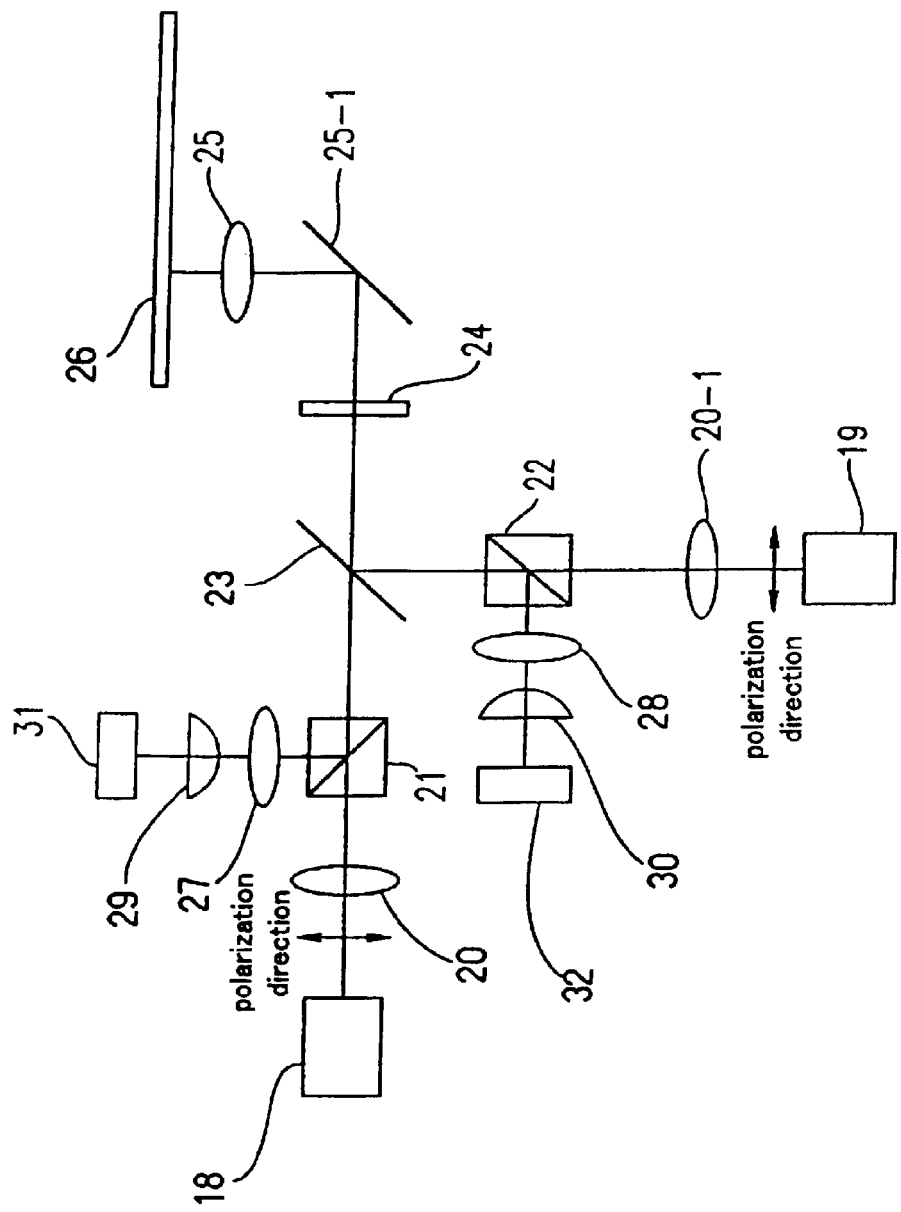
FIG. 3 shows a schematic diagram of another optical pickup in accordance with the first embodiment of the present invention.

Next, another configuration in which a photo detector is separated from a coherent light source and a polarization beam splitter (PBS) replaces the polarizing hologram is described, with reference to FIG. 3.

In the configuration shown in FIG. 3, lights emitted from a SHG blue laser 18 and a red semiconductor laser 19 pass through corresponding collimator lenses 20 and 20-1, and PBSs 21 and 22, and are coupled by a dielectric multi-layer film mirror 23 as a light coupling member, so as to be propagated on the same optical axis. The light beams coupled together pass through a wave plate 24 that functions similarly to the wave plate 7 used in the configuration shown in FIG. 1, are bent in the direction perpendicular to the face of the paper by a mirror 25-1 for bending an optical path (illustrated as being bent upward in FIG. 3) and are focused on an optical disk 26 by an objective lens 25.

The lights reflected by the optical disk 26 pass through the objective lens 25, the mirror 25-1 for bending the optical path and the wave plate 24 again, are transmitted and reflected by the dielectric multi-layer film mirror 23, and are guided to the PBSs 21 and 22 placed on the corresponding optical paths. Since the polarization directions of blue and red lights are rotated by 90° from the initial direction by the wave plate 24, the optical paths of these lights are bent by 90° by the corresponding PBSs 21 and 22. Then, the blue and red lights respectively pass through detecting lenses 27 and 28 and cylindrical lenses 29 and 30, and are focused on photo detectors 31 and 32.

In the configuration described above, a servo operation of a focusing direction is performed by an astigmatic method, and that of a tracking direction is performed by a differential phase detection method, thereby obtaining an excellent reproducing signal.

Also in the configuration shown in FIG. 3, the wave plate 24 is designed so that a phase modulation (retardation amount) of λ is obtained for 504 nm wavelength ($3/4 \cdot \lambda_2 < \lambda < 5/4 \cdot \lambda_1$) light. Therefore, the wave plate 24 functions as a 5/4 wave plate (506 nm) for blue light (wavelength $\lambda_1$) and as a 3/4 wave plate (502 nm) for red light (wavelength $\lambda_2$). In other words, the retardation amount λ of the wave plate 24 is substantially an uneven integer multiple of $\lambda_1/4$ for blue light (wavelength $\lambda_1$) and is also substantially an uneven integer multiple of $\lambda_2/4$ for red light (wavelength $\lambda_2$). Therefore, the wave plate 24 functions as a 1/4 wave plate for both lights. Consequently, in the optical detection system using the polarization beam splitter (PBS) as is shown in FIG. 3, a sufficient light quantity can also be guided onto the photo detectors, enabling a stable servo operation and signal detection. In particular, since the GaN and AlGaInP semiconductor lasers have a large variance in the emission wavelength between samples, which is different from the SHG blue laser, the configuration shown in FIG. 3 is very effective.

In addition, since the wave plate in the present embodiment is designed so as to function as the 1/4 wave plate, it accepts a wide range of wavelengths and is advantageous in a practical use.

Also in the optical pickup using the 650 nm wavelength AlGaInP semiconductor laser and the 395 nm wavelength GaN semiconductor laser, designing a wave plate for a 490 nm wavelength achieves the optical pickup having the effect similar to the above.

The wave plate according to the present embodiment also can be manufactured by using a birefringent material with large wavelength dispersion, other than quartz or the like as is mentioned above. For example, the birefringence of aromatic polysulfone resin for blue wavelength (380 nm) is 1.65 times as large as that for red wavelength (690 nm). Thus, by using this resin, a wave plate that functions as a 1/4 wave plate for 690 nm wavelength light and as a 3/4 wave plate for 380 nm wavelength light can be manufactured. A wave plate that is manufactured by using a birefringent material with large wavelength dispersion is described in the following.

The birefringence for 690 nm wavelength light in the aromatic polysulfone resin is expressed by $n_a$, and the thickness of the wave plate that is manufactured by using the aromatic polysulfone resin is expressed by d here. Accordingly, the birefringence for 380 nm wavelength light is 1.65 $n_a$. In this case, phase difference given to the 690 nm wavelength light is $n_a \times d$. The thickness d is selected such that the phase difference is ¼ of 690 nm, namely, the relationship of $n_a \times d = 690 \times ¼$ is satisfied.

When the thickness of the wave plate that is manufactured by using the aromatic polysulfone resin is expressed as d, the phase difference given to the 380 nm wavelength light is 1.65 $n_a \times d$. By using the relationship of $n_a \times d = 690 \times ¼$ above, 1.65×690×¼=285 nm is obtained. This phase difference corresponds to ¾ of 380 nm. In this manner, the aromatic polysulfone resin can be used to manufacture a wave plate that converts a linear polarization to a circular polarization for both red light (wavelength of 690 nm) and blue light (wavelength of 380 nm).

The aromatic polysulfone resin was used as a resin here, but other birefringent materials with large wavelength dispersion such as polyester having a unit containing a biphenyl skeleton, a naphthalene skeleton or a stilbene skeleton in a bond forming a principal chain as an element (see Publication of Japanese Unexamined Patent Application (Tokkai) No. Hei 7-233249) may be used without causing any problem.

In addition, by using a highly birefringent material, blue light with a wavelength of substantially 400 nm can be used to achieve the above.

When using a wave plate that is manufactured by using a birefringent material with large wavelength dispersion as is mentioned above, it is desirable that the retardation amount λ of this wave plate is (2n+3) times $\lambda_1/4$ for light with the wavelength $\lambda_1$ and is (2n+1) times $\lambda_2/4$ for light with the wavelength $\lambda_2$ (>$\lambda_1$) (n=0, 1, 2, . . . ).

Second Embodiment

In the present embodiment, an optical pickup using a laser unit in which a plurality of coherent light sources emitting lights with different wavelengths are mounted on the same substrate (submount) is described.

Figure 4:
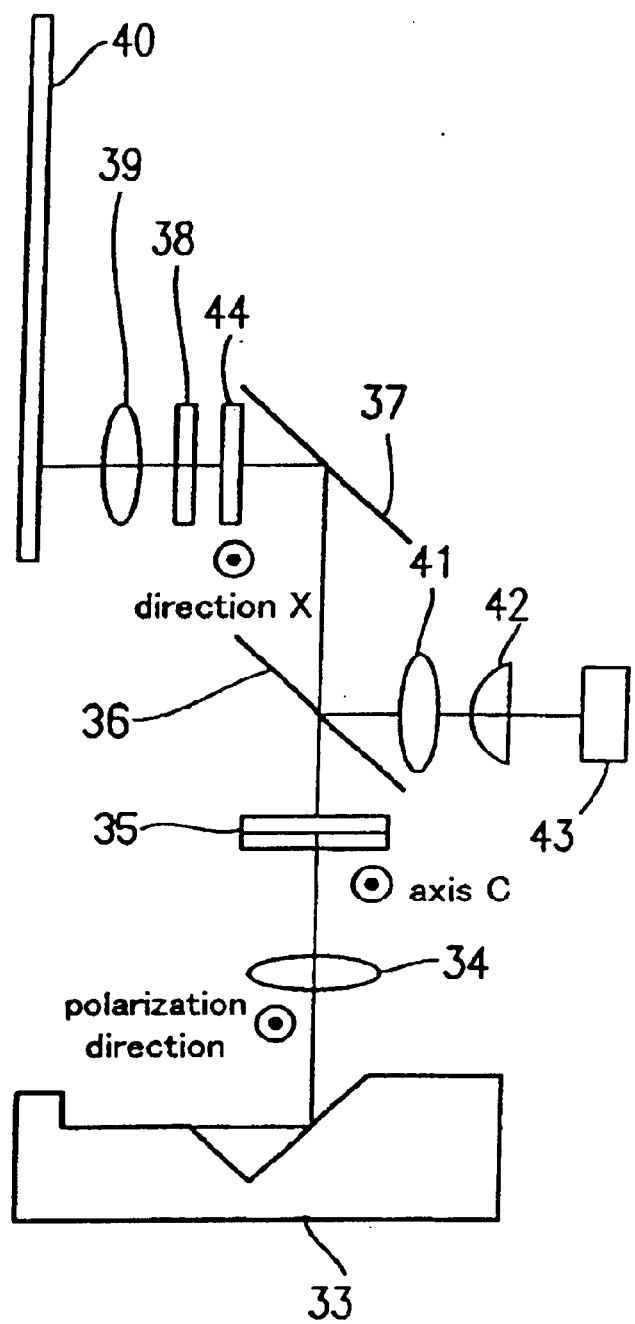
FIG. 4 shows a schematic diagram of an optical pickup in accordance with a second embodiment of the present invention.

Specifically, in the present embodiment, a laser unit in which a GaN blue semiconductor laser chip (wavelength of 405 nm), an AlGaInP red semiconductor laser chip (wavelength of 650 nm) and an AlGaAs near infrared semiconductor laser chip (wavelength of 790 nm) are mounted on a Si-submount is described. FIG. 4 shows a schematic diagram of the optical pickup in accordance with the present embodiment, and FIG. 5 shows a schematic diagram of a laser unit used therein.

Figure 5:
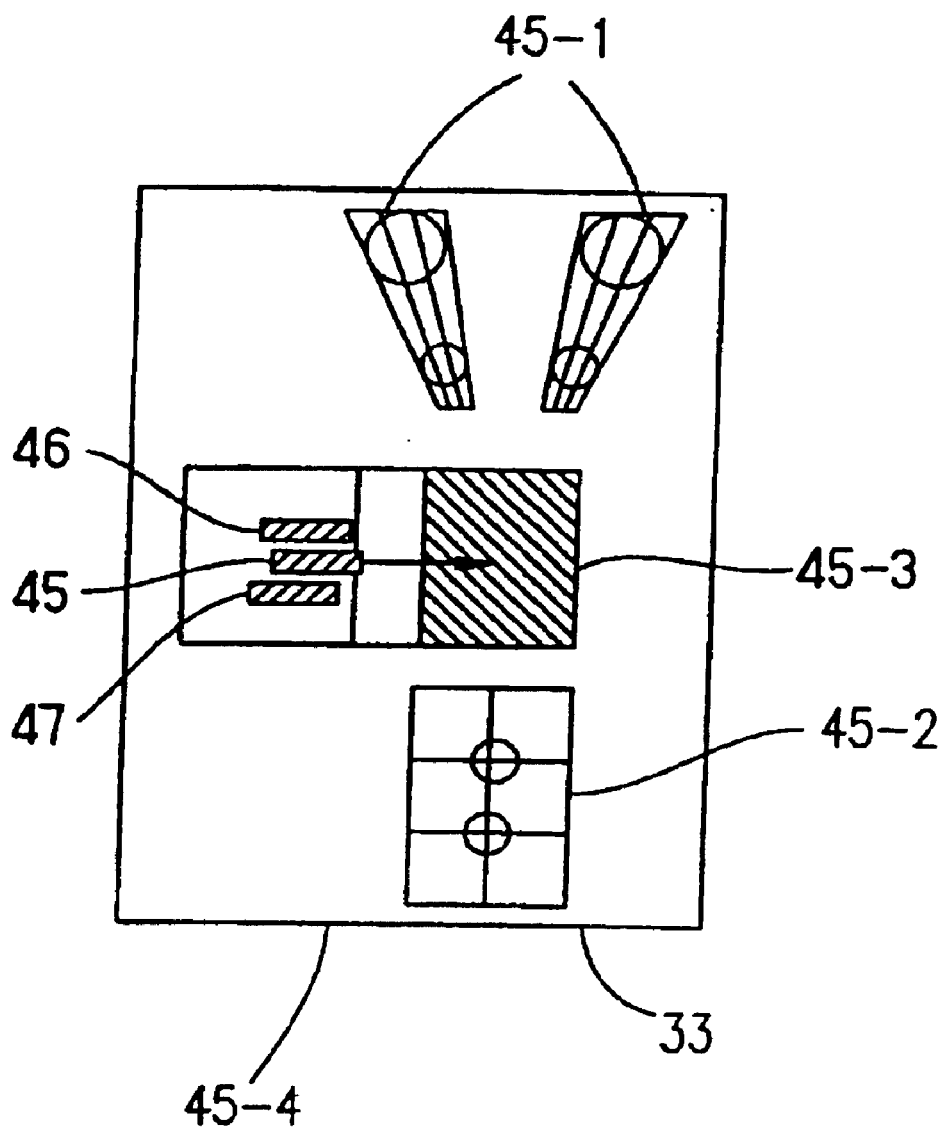
FIG. 5 shows a schematic diagram of a laser unit used in the optical pickup in accordance with the second embodiment of the present invention.

As is shown in FIG. 5, the GaN blue semiconductor laser chip 45, the AlGaInP red semiconductor laser chip 46 and the AlGaAs near infrared semiconductor laser chip 47 are mounted on the Si-submount 45-4. The blue semiconductor laser chip 45 (wavelength of 405 nm) that produces the shortest wavelength is mounted in the middle, and the red semiconductor laser chip 46 (wavelength of 650 nm) and the near infrared semiconductor laser chip 47 (wavelength of 790 nm) are mounted on both sides of the blue semiconductor laser chip 45 (wavelength of 405 nm) with a 200 μm gap.

Lights emitted from the respective laser chips 45 to 47 are reflected by an etched mirror 45-3 so that their optical paths are changed in direction, and then turned into parallel lights by a collimator lens 34 with a focal length of 25 mm (see FIG. 4). In the present embodiment, the collimator lens 34 is placed so that light emitted from the blue semiconductor laser chip 45 (wavelength of 405 nm) is located in the center of the lens (that is, on the optical axis). The laser chips 45 to 47 are adjusted to optimal focal positions so that the parallel lights can be obtained by the collimator lens 34.

As is shown in FIG. 4, the light that is made parallel by the collimator lens 34 passes through a polarizing hologram 35 and a dielectric multi-layer film mirror 36 and is bent in the direction perpendicular to the face of the paper by a mirror 37 for bending an optical path (illustrated as being bent to the left in FIG. 4). Subsequently, the light passes through a variable phase plate 44 and a wave plate 38 and is focused on an optical disk 40 by an objective lens 39. The dielectric multi-layer film mirror 36 is designed to have a reflectance of 50% for 780 nm wavelength light and transmit lights in blue region and red region by 100%. The wave plate 38 functions similarly to the wave plate used in the first embodiment.

Since the wave plate 38 is the same as that in the first embodiment, which is designed so that a phase modulation (retardation amount) of λ is obtained for 504 nm wavelength light, the light reflected by the optical disk 40 is diffracted by the polarizing hologram 35, achieving a high diffraction efficiency of 50% or higher.

Figure 6:
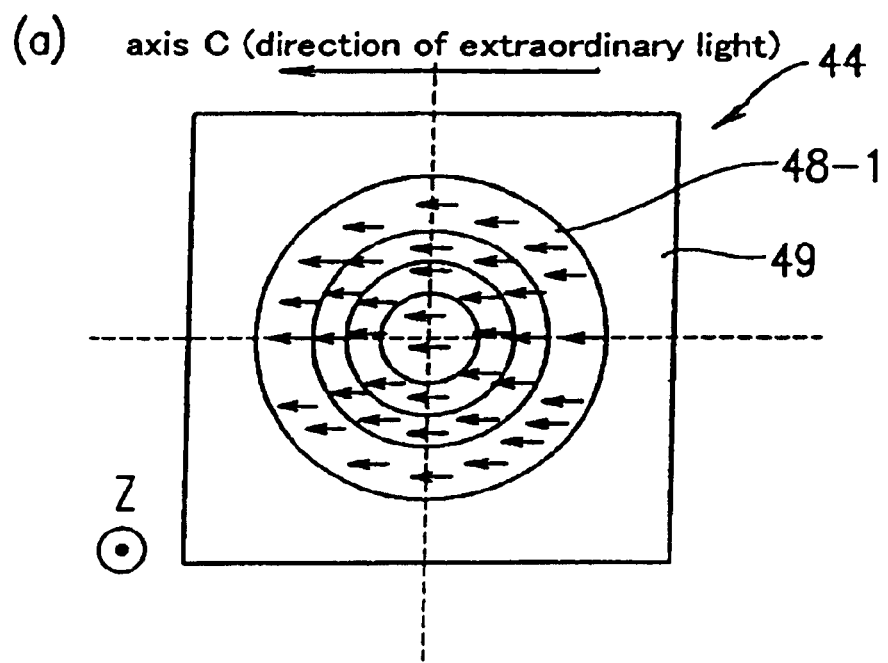
FIG. 6 shows a schematic diagram of a variable wave plate used in the optical pickup in accordance with the second embodiment of the present invention.
Figure 6:
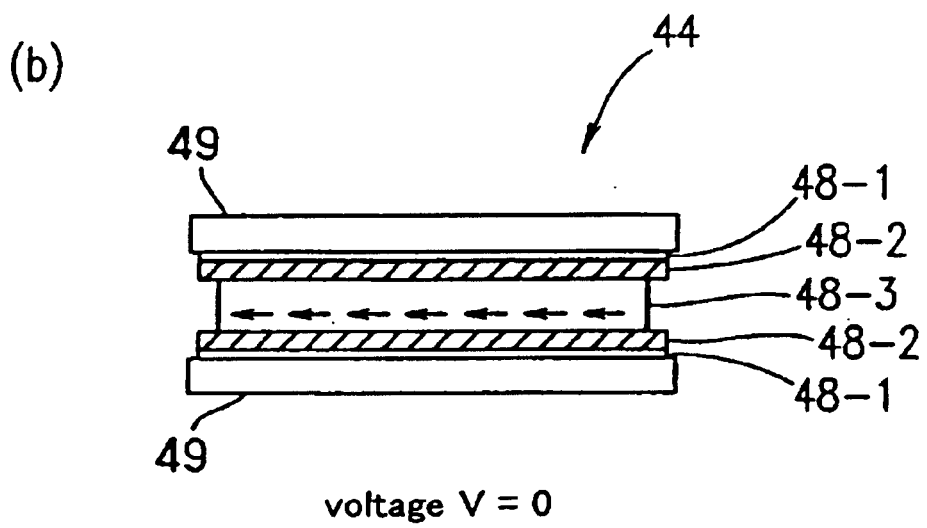

The variable phase plate 44 that is disposed between the mirror 37 for bending the optical path and the wave plate 38 corrects spherical aberration generated in the objective lens 39. FIGS. 6(a) and (b) show a configuration of the variable phase plate 44.

As is shown in FIG. 6(b), the variable phase plate 44 includes a liquid crystal 48-3, (polyimide-based) orientation films 48-2 sandwiching the liquid crystal 48-3, ITO (InSnO$_x$) electrodes 48-1 and glass substrates 49. The liquid crystal 48-3 has a thickness of 2 μm, and each orientation film 48-2 has a thickness of 80 nm. The orientation film 48-2 is rubbed so that a major axis (arrow) of the liquid crystal 48-3 is directed towards an axis C direction shown in FIG. 6(a).

A liquid crystal that has positive dielectric anisotropy (for example, ZLI-4792 manufactured by Merck & Co., Inc.) is used as the liquid crystal 48-3. By applying a voltage (about 60 Hz) to the liquid crystal 48-3, the orientation direction thereof is inclined towards an axis Z direction gradually, thus decreasing the refractive index for a polarization direction of the axis C. Accordingly, adjusting the applied voltage changes the refractive index, namely the phase of the liquid crystal 48-3 in the axis C direction. FIG. 6(a) shows the condition of the liquid crystal 48-3 when no voltage is applied.

Every 500 μm in the radial direction, the ITO electrode 48-1 is divided into regions of concentric rings. However, FIG. 6(a) conceptually illustrates only four ITO electrodes 48-1.

Figure 7:
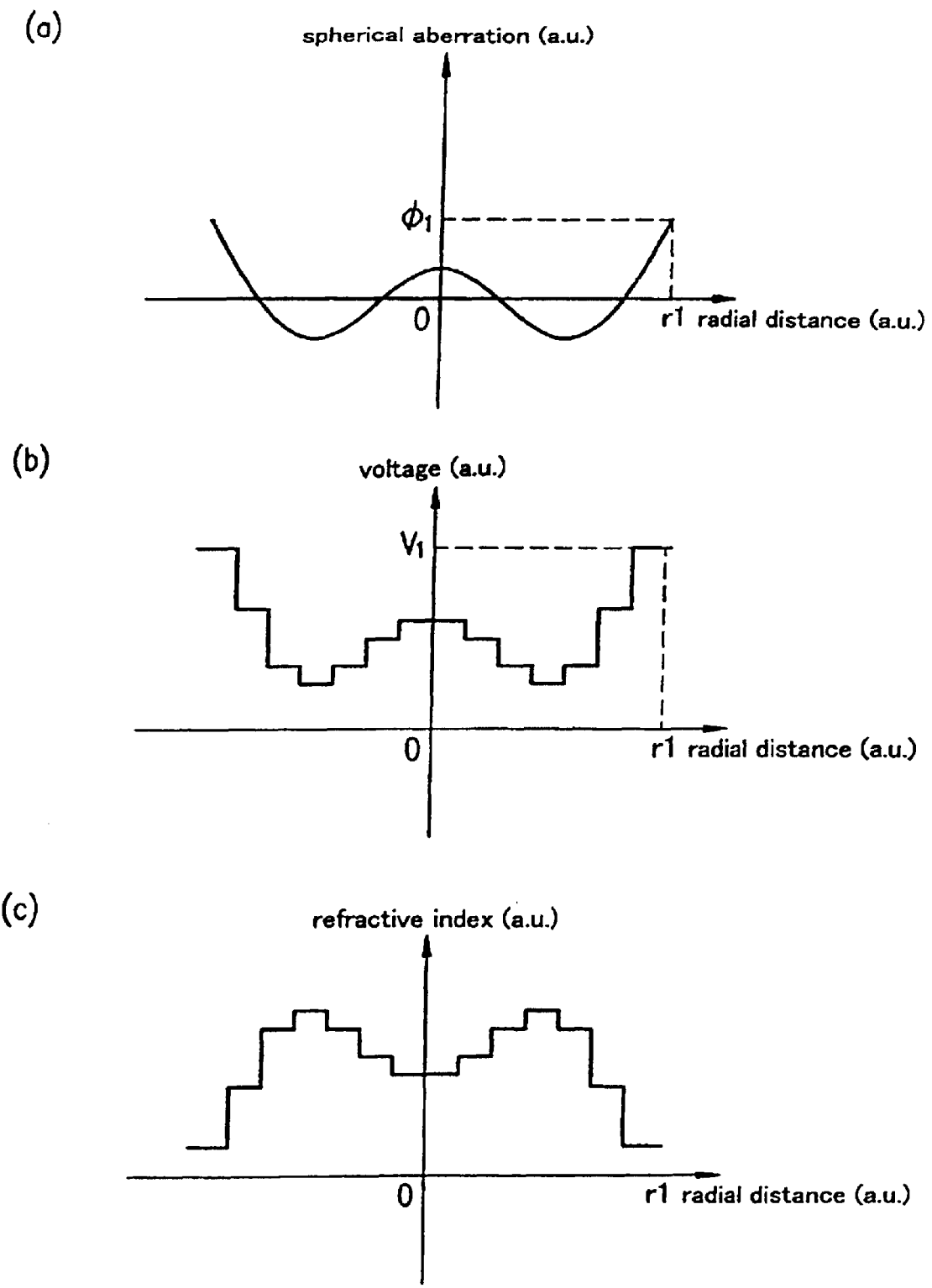
FIG. 7 is a graph for explaining a concept of correcting a spherical aberration with a variable phase plate in accordance with the second embodiment of the present invention.

The objective lens 39 is an aspherical lens designed to have the smallest aberration for blue light. FIG. 7(a) shows a distribution of spherical aberration generated when red light enters the objective lens 39. In this case, applying a voltage with the distribution shown in FIG. 7(b) to the variable phase plate 44 compensates for the spherical aberration shown in FIG. 7(a).

Specifically, when the objective lens 39 is the aspherical lens with an effective beam diameter of 4 mm, the maximum spherical aberration of $\phi_1=100$ m$\lambda$ was generated for red light. In this case, applying a voltage of $V_1=5$ V generated the distribution of refractive index shown in FIG. 7(c), thereby compensating for the spherical aberration of the aspherical lens (the objective lens 39) for red light. As a result, red light that was linearly polarized entered the variable phase plate 44 in the axis C direction, passed through the wave plate 38 and was focused on the optical disk 40 with a base material thickness of 0.6 mm by the objective lens 39, realizing excellent focusing properties. Similarly, applying a voltage so as to compensate for the spherical aberration generated in the objective lens 39 provides excellent focusing properties for near infrared light.

The present embodiment was an example of compensating for the spherical aberration generated by chromatic aberration, but spherical aberration generated by a difference of the base material thickness can also be compensated for. Since the spherical aberration generated by the difference of the base material thickness becomes large especially for blue light, it is especially advantageous in a practical use.

The present embodiment used the liquid crystal that has positive dielectric anisotropy as the liquid crystal material, but using a liquid crystal that has negative dielectric anisotropy (for example, MLC-6608 manufactured by Merck & Co., Inc.) can achieve the similar effect. When using the liquid crystal that has negative dielectric anisotropy, it is desirable that the orientation is processed such that the major axis of the liquid crystal inclines more or less from the axis Z direction to the axis C direction.

As is shown in FIGS. 4 and 5, the lights reflected by the optical disk 40 are respectively guided to a photo detector 43 and photo detectors 45-1 and 45-2 that are integrated in a laser unit 33.

Near infrared light with a wavelength of 790 nm is reflected by the dielectric multi-layer film mirror 36, passes through a detecting lens 41 and a cylindrical lens 42, and is guided to the four-divided photo detector 43. In this case, a focus servo is performed by an astigmatic method, and a tracking servo is performed by a push-pull method.

On the other hand, blue light with a wavelength of 405 nm and red light with a wavelength of 650 nm are diffracted by the polarizing hologram 35, pass through the collimator lens 34, and are guided to the three-divided photo detectors 45-1 and the six-divided photo detector 45-2 that are disposed on the laser unit 33. In this case, the three-divided photo detectors 45-1 perform a focus servo by a SSD method, and the six-divided photo detector 45-2 performs a tracking servo by the differential phase detection method. As is shown in FIG. 5, a configuration in which the upper four photo detectors of the six-divided photo detector 45-2 detect blue light and the lower four photo detectors thereof detect red light can reduce the dividing number of the photo detector 45-2 from 8 to 6.

In the configurations of FIGS. 4 and 5, the blue semiconductor laser chip 45 producing the shortest wavelength is adjusted to the center of the collimator lens 34 (that is, mounted on the position on the submount 45-4 corresponding to the center of the optical axis of the collimator lens 34), and a liquid crystal lens (the variable phase plate 44) can compensate for aberration of the objective lens 39. Consequently, a total transmitted wavefront aberration can be suppressed to a value of 50 m$\lambda$ or smaller for every wavelength light, thereby achieving excellent reproducing properties.

Since the optical pickup in accordance with the present embodiment is provided with the light sources of blue, red and near infrared lights respectively having optical detection systems, the HD-DVD-Rs can be reproduced by blue light, the DVD-Rs can be reproduced by red light and the CD-Rs can be reproduced by near infrared light respectively in a stable manner.

Figure 8:
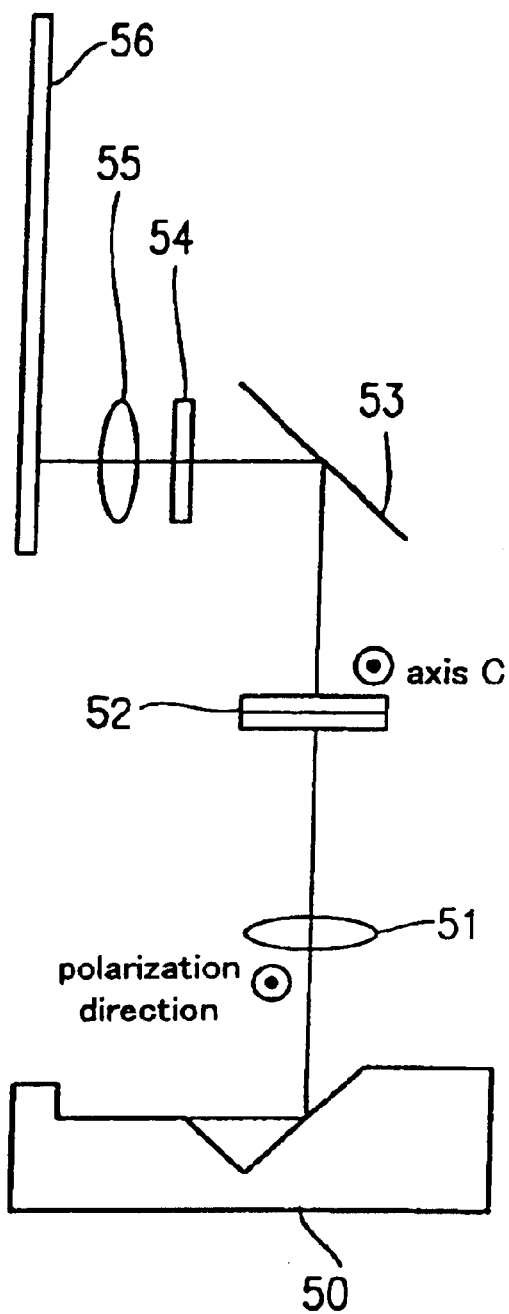
FIG. 8 shows a schematic diagram of another optical pickup in accordance with the second embodiment of the present invention.

Furthermore, the configurations shown in FIGS. 4 and 5 were an example of the laser unit 33 on which three light sources of different wavelengths (the GaN blue semiconductor laser chip 45, the AlGaInP red semiconductor laser chip 46 and the AlGaAs near infrared semiconductor laser chip 47) are mounted, but using a laser unit on which laser chips of two wavelengths, which are the GaN blue semiconductor laser chip and the AlGaInP red semiconductor laser chip, are mounted can achieve the similar effect. FIG. 8 shows a schematic diagram in the above case.

In the configuration shown in FIG. 8, two semiconductor laser chips of the GaN blue semiconductor laser chip and the AlGaInP red semiconductor laser chip are mounted on a laser unit 50. As similar to the case shown in FIG. 5, three-divided photo detectors and a six-divided photo detector are mounted thereon (not shown in FIG. 8). A collimator lens 51 is placed so that light emitted from the GaN blue semiconductor laser chip producing shorter wavelength is located in the center of the lens (that is on the optical axis). The light passes through a polarizing hologram 52, is bent in the direction perpendicular to the face of the paper by a mirror 53 for bending an optical path (illustrated as being bent to the left in FIG. 8), passes through a wave plate 54 that functions similarly to the wave plate used in the first embodiment, and then is focused on an optical disk 56 by an objective lens 55.

The light that is reflected by the optical disk 56 passes through the objective lens 55, the wave plate 54 and the mirror 53 for bending the optical path again, is diffracted by the polarizing hologram 52, and is guided to photo detectors integrated in the laser unit 50 to perform a servo operation and detection of a RF signal.

In the configuration of FIG. 8, the blue semiconductor laser chip producing the shortest wavelength also is adjusted to the center of the collimator lens 51 (that is, mounted on the position on the submount corresponding to the center of the optical axis of the collimator lens 51). Consequently, a total transmitted wavefront aberration can be suppressed to a value of 50 m$\lambda$ or smaller for every wavelength light, thereby realizing excellent reproducing properties. In addition, since the optical pickup is provided with the light sources of blue and red lights respectively having optical detection systems, the HD-DVD-Rs can be reproduced by blue light and the DVD-Rs can be reproduced by red light respectively in a stable manner.

As is described in the present embodiment, a plurality of semiconductor laser chips are mounted on the same submount, and a single collimator lens is provided in order to turn light into parallel light, thereby providing a small-size optical pickup, considerably reducing the thickness of an optical disk drive. Furthermore, since a small-size SHG blue laser by a direct coupling has been suggested, the SHG blue laser can be provided instead of the GaN semiconductor laser to achieve the similar effect.

When using an aspherical lens as an objective lens, incidence of light with a different wavelength generates spherical aberration caused by chromatic aberration. However, as is described in the present embodiment, using the variable phase plate including a liquid crystal divided into regions of concentric rings can compensate for the spherical aberration generated in the objective lens. In the optical pickup on which coherent light sources of multiple wavelengths are mounted, it is especially advantageous in a practical use.

Third Embodiment

In the present embodiment, an optical pickup in which lights emitted from a plurality of coherent light sources can be coupled by a dielectric multi-layer film mirror as a light coupling member and focused on an optical disk by a single objective lens is described. Generally, light transmitted and reflected by a plurality of optical components is affected by aberration of the optical components. A configuration in accordance with the present embodiment is effective in solving this problem.

Figure 9:
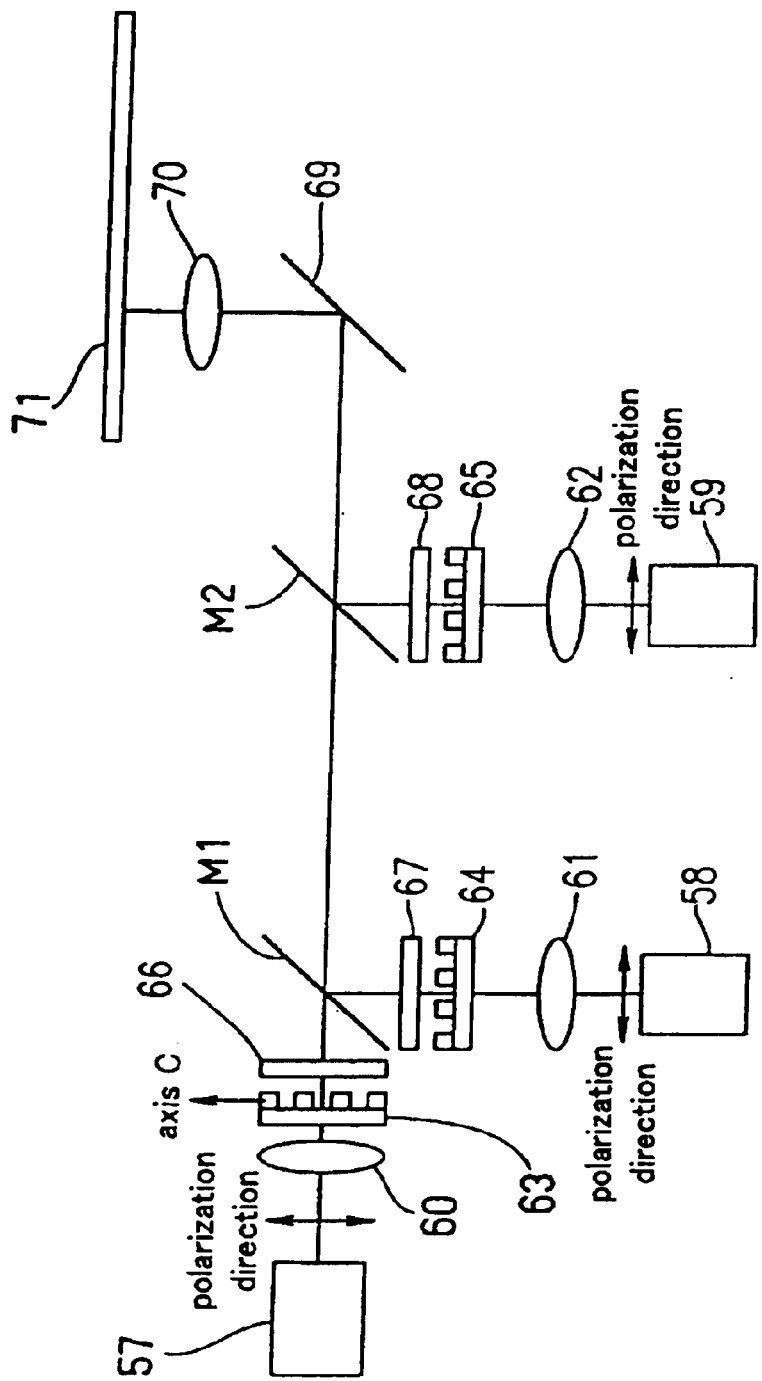
FIG. 9 shows a schematic diagram of an optical pickup in accordance with a third embodiment of the present invention.

FIG. 9 shows a schematic diagram of the optical pickup in accordance with the present embodiment. As is shown in FIG. 8, the optical pickup of the present embodiment has a GaN blue semiconductor laser unit 57 (wavelength of 405 nm), an AlGaInP red semiconductor laser unit 58 (wavelength of 650 nm) and an AlGaAs near infrared semiconductor laser unit 59 (wavelength of 790 nm) in which photo detectors are integrated respectively. Lights emitted from these laser units 57 to 59 are coupled by two dielectric multi-layer film mirrors M1 and M2 as a light coupling member.

The lights emitted from semiconductor laser units 57 to 59 are turned into parallel lights by collimator lenses 60 to 62 respectively and pass through polarizing holograms 63 to 65 and wave plates 66 to 68. The wave plates 66 to 68 are designed so that a phase modulation (retardation amount) of $\lambda/4$ is obtained for each wavelength light, thereby converting each wavelength light to circularly polarized light.

Figure 10:
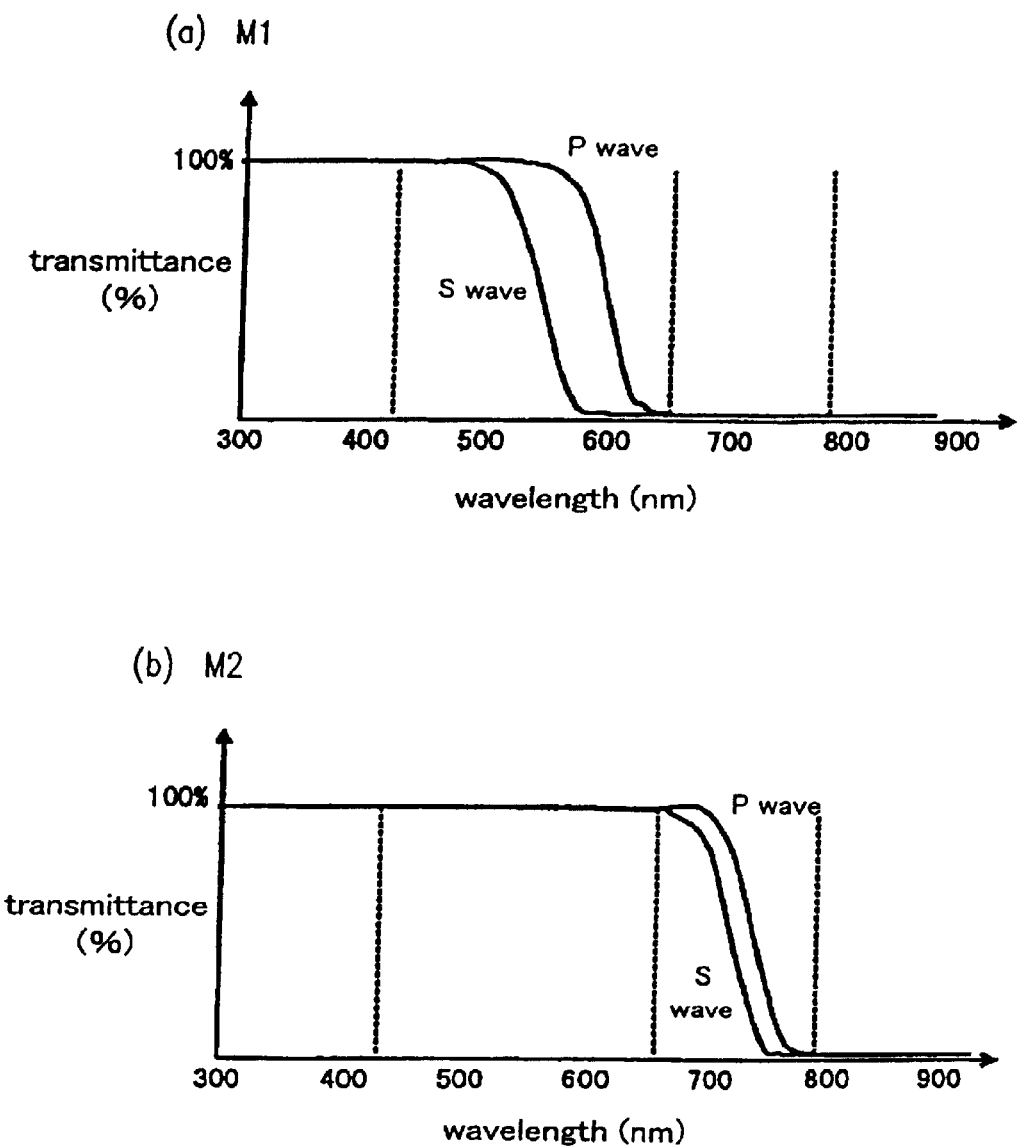
FIG. 10 is a graph showing transmitting properties of two dielectric multi-layer film mirrors used in the optical pickup in accordance with the third embodiment of the present invention.

FIGS. 10(a) and (b) show transmitting properties of the two dielectric multi-layer film mirrors M1 and M2. As is shown in FIG. 10(a), the dielectric multi-layer film mirror M1 transmits 95% or more of light with a wavelength of 500 nm or shorter for both P wave and S wave and reflects 95% or more of light with a wavelength of 500 nm or longer for both P wave and S wave. On the other hand, as is shown in FIG. 10(b), the dielectric multi-layer film mirror M2 transmits 95% or more of light with a wavelength of 700 nm or shorter for both P wave and S wave and reflects 95% or more of light with a wavelength of 700 nm or longer for both P wave and S wave.

These dielectric multi-layer film mirrors M1 and M2 include multi-layers (twenty layers or more in total) of $SiO_2$ and $TiO_2$. The dielectric multi-layer film mirror M2 is manufactured so as to have a wavelength difference of 50 nm or less between the P-wave flank and the S-wave flank, by controlling the layer thickness with high precision.

Blue light with a wavelength of 405 nm emitted from the blue semiconductor laser unit 57 passes through the dielectric multi-layer film mirrors M1 and M2. Red light with a wavelength of 650 nm emitted from the red semiconductor laser unit 58 is reflected by the dielectric multi-layer film mirror M1 and then passes through the dielectric multi-layer film mirror M2. Also, near infrared light with a wavelength of 790 nm emitted from the near infrared semiconductor laser unit 59 is reflected by the dielectric multi-layer film mirror M2. Consequently, the three lights are coupled so as to be propagated on the same optical axis. The coupled lights are bent in the direction perpendicular to the face of the paper by a mirror 69 for bending an optical path (illustrated as being bent upward in FIG. 9) and focused on an optical disk 71 by an objective lens 70. In the configuration shown in FIG. 8, a combined lens with a numerical aperture (NA) of 0.6 is used as the objective lens 70 in order to minimize the aberration for the lights with three different wavelengths.

The lights reflected by the optical disk 71 follow the same optical path as that of the incident lights, but polarization directions thereof are rotated by 90° from those of the incident lights by the wave plates 66 to 68. Subsequently, the lights reflected by the optical disk 71 are diffracted by the polarizing holograms 63 to 65 and guided to corresponding photo detectors integrated in the laser units 57 to 59. The photo detector includes three-divided photo detectors and a six-divided photo detector as in the second embodiment. In this case, the three-divided photo detectors performs a focus servo by a SSD method, and the six-divided photo detector performs a tracking servo by a differential phase detection method.

In general, the transmitted wavefront aberration is smaller than the reflected wavefront aberration in an optical component. On the one hand, when light is transmitted by the optical component, aberrations are cancelled between front and back surfaces, so only the aberration generated in the front surface condition has to be considered. On the other hand, when light is reflected by the optical component, distortion of the optical component directly affects the wavefront aberration. Therefore, it is desirable that the optical component is used as a transmitting component because it generates smaller aberration. In addition, the optical components with the same wavefront aberration generate larger aberration for shorter wavelength light.

Considering the above-mentioned points, the optical pickup according to the present embodiment shown in FIG. 9 is configured so that light emitted from the GaN blue semiconductor laser unit 57 producing the shortest wavelength passes through the dielectric multi-layer film mirrors M1 and M2.

In the configuration shown in FIG. 9, the transmitted wavefront aberration after passing through the objective lens can be suppressed to 50 m$\lambda$ or smaller for each wavelength light, thereby achieving excellent reproducing properties. Since the optical pickup of the configuration shown in FIG. 9 is provided with the light sources of blue, red and near infrared lights respectively having optical detection systems, the HD-DVD-Rs can be reproduced by blue light, the DVD-Rs can be reproduced by red light and the CD-Rs can be reproduced by near infrared light respectively in a stable manner.

Figure 11:
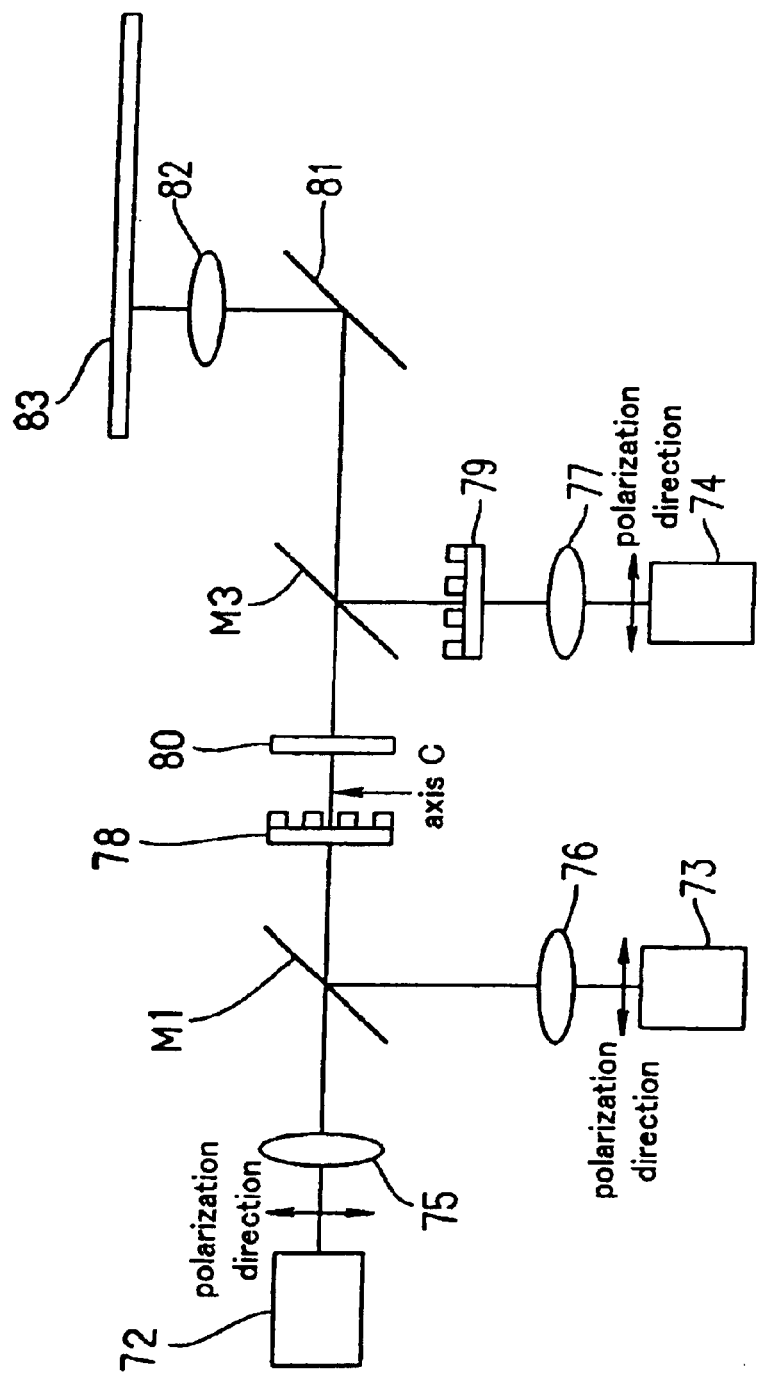
FIG. 11 shows a schematic diagram of another optical pickup in accordance with the third embodiment of the present invention.

FIG. 11 shows a schematic diagram of another optical pickup in accordance with the present embodiment. The optical pickup shown in FIG. 11 uses a dielectric multi-layer film mirror M3 whose transmitting properties are different between P wave and S wave instead of the dielectric multi-layer film mirror M2.

Figure 12:
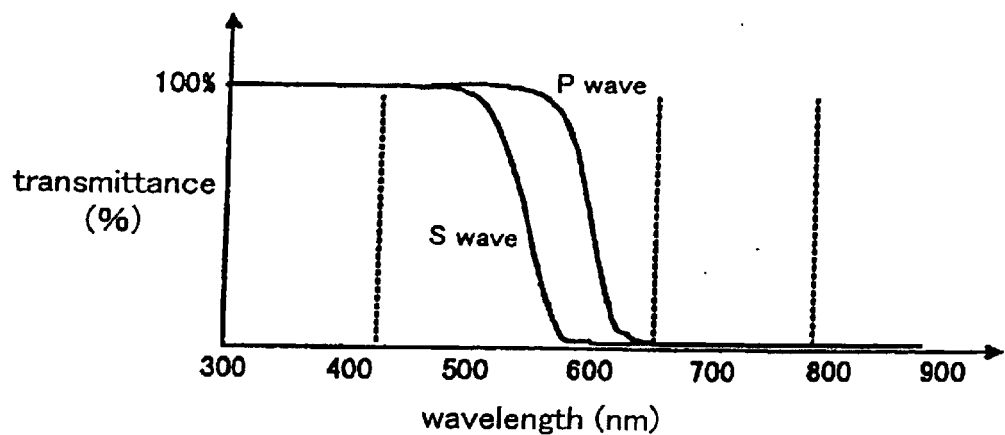
FIG. 12 is a graph showing transmitting properties of two dielectric multi-layer film mirrors used in another optical pickup in accordance with the third embodiment of the present invention.
Figure 12:
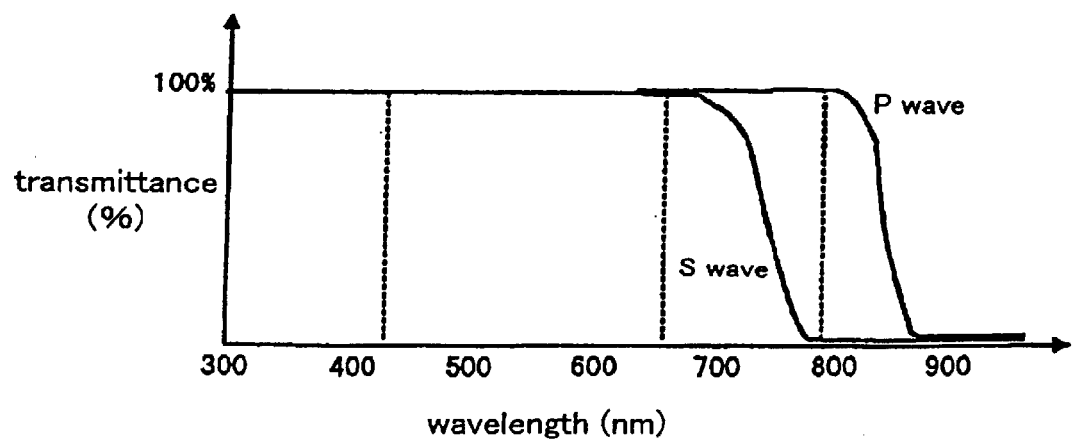

In order to obtain the same transmitting properties for both S wave and P wave in a dielectric multi-layer film mirror, it is necessary to perform a precise control during sputtering. Considering a yield during mass-production, the configuration that is provided with the dielectric multi-layer film mirrors M1 and M3 respectively having the transmitting properties as is shown in FIGS. 12(a) and (b) is more advantageous. Specifically, as is shown in FIG. 12(b), the dielectric multi-layer film mirror M3 is designed to have P-wave transmittance of 95% or higher and S-wave reflectance of 95% or higher for 790 nm wavelength light. On the other hand, as is shown in FIG. 12(a), the dielectric multi-layer film mirror M1 transmits 95% or more of light with a wavelength of 500 nm or shorter for both P wave and S wave and reflects 95% or more of light with a wavelength of 500 nm or longer for both P wave and S wave, which is similar to the dielectric multi-layer film mirror M1 shown in FIG. 10(a).

In the configuration shown in FIG. 11, lights emitted from a GaN blue semiconductor laser unit 72 (wavelength of 405 nm) and an AlGaInP red semiconductor laser unit 73 (wavelength of 650 nm) are turned into parallel lights by collimator lenses 75 and 76 respectively and coupled by the dielectric multi-layer film mirror M1 so as to be propagated on the same optical axis. The two lights coupled together pass through a polarizing hologram 78 and a wave plate 80 and are converted to circularly polarized lights respectively. The wave plate 80 functions similarly to the wave plate used in the first embodiment. In other words, the retardation amount $\lambda$ of the wave plate 80 is substantially an uneven integer multiple of $\lambda_1/4$ for blue light (wavelength $\lambda_1$) and is also substantially an uneven integer multiple of $\lambda_2/4$ for red light (wavelength $\lambda_2$). Therefore, the wave plate 80 functions as a 1/4 wave plate for lights with both wavelengths.

The near infrared light with a wavelength of 790 nm emitted from an AlGaAs near infrared semiconductor laser unit 74 is turned into parallel light by a collimator lens 77, passes through an unpolarizing glass hologram 79, and is reflected by the dielectric multi-layer film mirror M3. Thus, the three lights are coupled so as to be propagated on the same optical axis in the end.

The three lights coupled together are bent in the direction perpendicular to the face of the paper by a mirror 81 for bending an optical path (illustrated as being bent upward in FIG. 11) and focused on an optical disk 83 by an objective lens 82. In the configuration shown in FIG. 11, a combined lens with a numerical aperture (NA) of 0.6 is also used as the objective lens 82 in order to minimize the aberration for the lights with three different wavelengths.

The lights reflected by the optical disk 83 follow the same optical paths as that of the incident light and are guided to corresponding photo detectors integrated in the laser units 72 to 74.

In other words, the blue light (wavelength of 405 nm) and the red light (wavelength of 650 nm) enter the wave plate 80 by which polarization directions thereof are rotated by 90° from the initial polarization directions, are diffracted by the polarizing hologram 78 and are guided to corresponding photo detectors integrated in the laser units 72 and 73.

With respect to the near infrared light (wavelength of 790 nm), since the transmitting properties of the dielectric multi-layer film mirror M3 is different between P wave and S wave, the unpolarizing glass hologram 79 is used as the optical component that is included in an optical detection system disposed corresponding to the AlGaAs near infrared semiconductor laser unit 74. The near infrared light (wavelength of 790 nm) reflected by the optical disk 83 is reflected by the dielectric multi-layer film mirror M3, passes through the glass hologram 79 and the collimator lens 77, and is guided to a photo detector integrated in the laser unit 74. In contrast with the configuration shown in FIG. 9, since the light quantity of the near infrared light guided to the photo detector decreases due to the use of the glass hologram 79, a gain of the servo system has to be adjusted. However, there was no deterioration in the reproducing properties observed.

In the configuration shown in FIG. 11, since the light emitted from the GaN blue semiconductor laser unit 72 producing the shortest wavelength passes through the dielectric multi-layer film mirrors M1 and M3, the transmitted wavefront aberration after passing through the objective lens can be suppressed to 50 m$\lambda$ or smaller for each wavelength light, thereby achieving excellent reproducing properties. Since the optical pickup of the configuration shown in FIG. 11 is provided with the light sources of blue, red and near infrared lights respectively having optical detection systems, the HD-DVD-Rs can be reproduced by blue light, the DVD-Rs can be reproduced by red light and the CD-Rs can be reproduced by near infrared light respectively in a stable manner.

The present embodiment uses the GaN semiconductor laser as a blue semiconductor laser, but a SHG blue laser can be used instead of the GaN semiconductor laser to achieve the similar effect.

Also, the present embodiment uses the combined lens as the objective lens in order to minimize the aberration for the lights with three different wavelengths, but, as in the second embodiment, a configuration using an aspherical lens as the objective lens so that a liquid crystal lens (the variable phase plate) compensates for the aberration of the aspherical lens (the objective lens) can achieve the similar effect.

Fourth Embodiment

In the present embodiment, an optical pickup and an optical information recording/reproducing apparatus that have an optical detection system using a plurality of coherent light sources and a polarizing hologram and can perform a servo operation and detect a reproducing signal by a single wave plate in a stable manner are described.

In order to obtain the optical pickup and the optical information recording/reproducing apparatus mentioned above, the present embodiment uses a phase variable wave plate including a liquid crystal layer. A GaN blue semiconductor laser (wavelength of 405 nm), an AlGaInP red semiconductor laser (wavelength of 650 nm) and an AlGaAs near infrared semiconductor laser (wavelength of 790 nm) are used as the coherent light sources.

FIG. 13(a) shows a schematic diagram of the optical pickup in accordance with the present embodiment, and FIG. 13(b) shows a schematic view illustrating the relationship between principal axes of birefringent crystal of a polarizing hologram and an optical disk and polarization directions of coherent light sources in the configuration of FIG. 13(a). The present configuration also uses dielectric multi-layer film mirrors M1 and M2 similar to those shown in FIG. 9, which show the same transmitting properties for both P wave and S wave in every wavelength.

Figure 13:
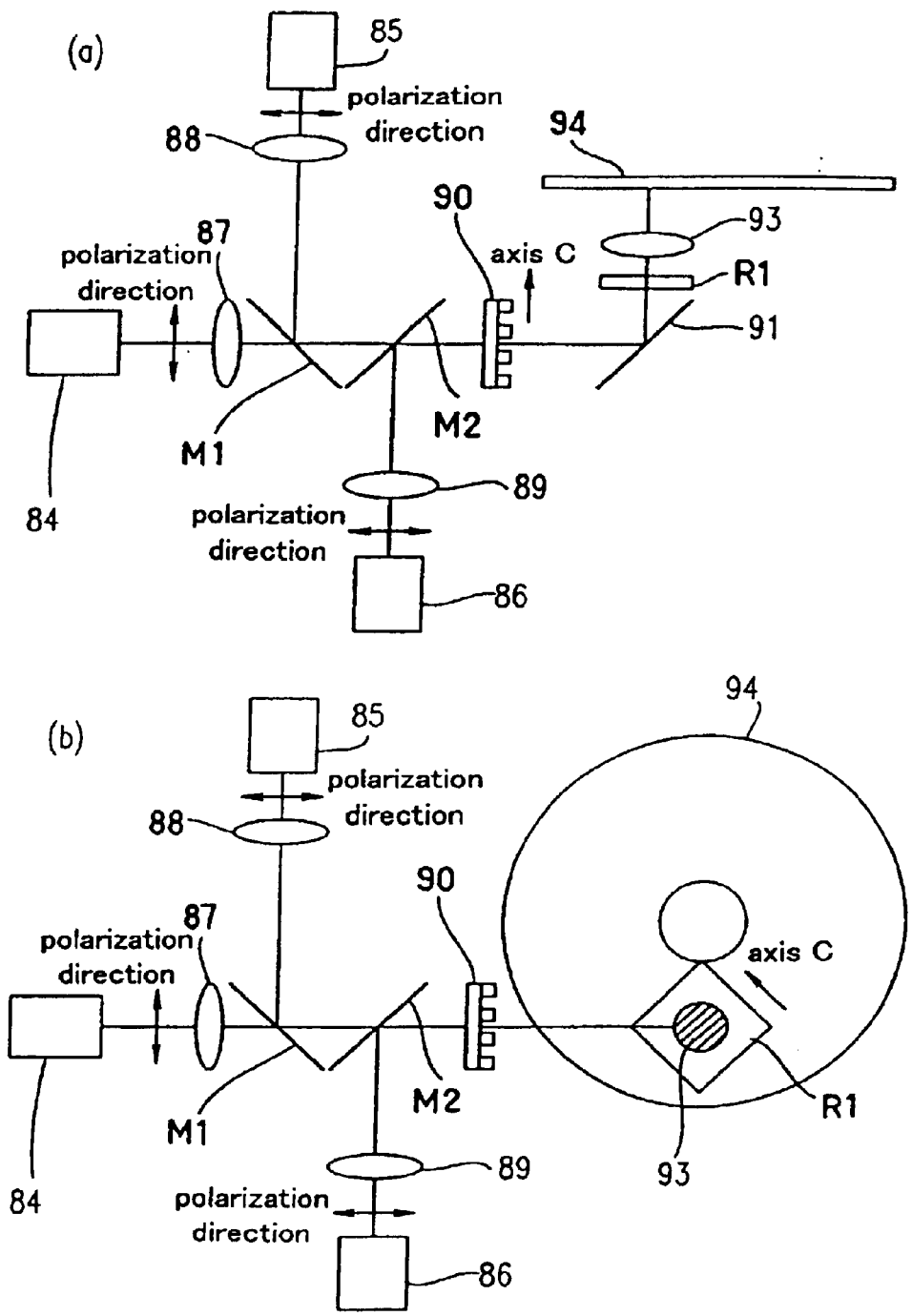
FIG. 13(*a*) shows a schematic diagram of an optical pickup in accordance with a fourth embodiment of the present invention, and FIG. 13(*b*) shows a schematic view illustrating the relationship between the principal axes of birefringent crystal of a polarizing hologram and an optical disk and polarization directions of coherent light sources in the configuration of FIG. 13(*a*).

In the configuration shown in FIG. 13, lights emitted from a GaN blue semiconductor laser unit 84 (wavelength of 405 nm) and an AlGaInP red semiconductor laser unit 85 (wavelength of 650 nm) are turned into parallel lights by collimator lenses 87 and 88 respectively and coupled by the dielectric multi-layer film mirror M1 so as to be propagated on the same optical axis. On the other hand, near infrared light with a wavelength of 790 nm emitted from an AlGaAs near infrared semiconductor laser unit 86 is turned into parallel light by a collimator lens 89 and reflected by the dielectric multi-layer film mirror M2. Thus, the three lights are coupled so as to be propagated on the same optical axis. The three lights coupled together pass through a polarizing hologram 90, are bent in the direction perpendicular to the face of the paper by a mirror 91 for bending an optical path (illustrated as being bent upward in FIG. 13(a)), pass through a phase variable wave plate R1, and are focused on an optical disk 94 by an objective lens 93. A combined lens is used as the objective lens 93.

In the present embodiment, since the dielectric multi-layer film mirrors M1 and M2 have the same transmitting properties for both P wave and S wave, the optical detection systems are configured for every wavelength light by using the polarizing hologram 90. Accordingly, the phase variable wave plate R1 should be adjusted so as to function as a 1/4 wave plate for every wavelength light. Thus, the present embodiment uses a phase variable wave plate that includes the liquid crystal layer shown in FIGS. 14(a) to (c) as the phase variable wave plate R1.

The following is a description of a configuration of the phase variable wave plate R1. As is shown in FIG. 14(b), the phase variable wave plate R1 includes a liquid crystal 98, (polyimide-based) orientation films 97 sandwiching the liquid crystal 98, ITO (InSnO$_x$) electrodes 96 and glass substrates 95, which is similar to the variable phase plate 44 described in the second embodiment. The liquid crystal 98 has a thickness of 3 μm, and each orientation film 97 has a thickness of 80 nm. The orientation film 97 is rubbed so that a major axis (arrow) of the liquid crystal 98 is directed towards an axis C direction shown in FIG. 13(a).

A liquid crystal that has positive dielectric anisotropy (for example, ZLI-4792 manufactured by Merck & Co., Inc.) is used as the liquid crystal 98. By applying a voltage (about 60 Hz) to the liquid crystal 98, the orientation direction thereof is inclined towards an axis Z direction gradually, thus decreasing the refractive index for a polarization direction of the axis C. Accordingly, adjusting the applied voltage changes the refractive index, namely the phase of the liquid crystal 98 in the axis C direction. FIG. 14(b) shows an inclination of the liquid crystal 98 when no voltage is applied, and FIG. 14(c) shows an inclination of the liquid crystal 98 when voltage V=V1 is applied.

The phase modulation φ (rad) due to the inclination of the liquid crystal 98 is expressed approximately by $\phi$ (rad)~$2p\times\Delta n \times d\times(\cos 2\theta)/\lambda$, wherein Δn denotes a birefringence amount of the liquid crystal, d denotes a thickness of the liquid crystal, and θ denotes an inclination of the liquid crystal. Thus, when θ=0 (applied voltage V=0) for λ=780 nm and Δn=0.1, the phase modulation of 0.385λ is obtained. Accordingly, by applying a voltage of 1.5 V, the liquid crystal 98 was inclined so as to have the angle θ shown in FIG. 13(c), thereby adjusting the phase variable wave plate R1 to have the phase modulation of 0.25λ (λ/4) for light with a wavelength λ=780 nm.

As is described above, the phase variable wave plate R1 used in the present embodiment can change a phase modulation in a desired manner by changing a voltage applied. Therefore, a phase modulation of λ/4 can be obtained for both red light and blue light. Specifically, in the present embodiment, applying a voltage of 2 V for red light and that of 5 V for blue light to the phase variable wave plate R1 enable the phase variable wave plate R1 to function as a 1/4 wave plate for each wavelength light.

The phase variable wave plate R1 is disposed so that its principal crystal axis (an axis C: the direction of extraordinary light) is inclined by 45° with respect to the polarization direction of the coupled light.

The lights reflected by the optical disk 94 enter the phase variable wave plate R1 by which a polarization direction thereof is rotated by 90° from the initial polarization direction, are diffracted by the polarizing hologram 90 and are then guided onto photo detectors integrated in the respective semiconductor laser units 84 to 86.

In the phase variable wave plate R1, adjusting an applied voltage changes the refractive index in the axis C direction, thereby changing the phase modulation that is obtained. Also, since the polarization direction of the coupled light is inclined by 45° with respect to the principal crystal axis (the axis C) of the phase variable wave plate R1, adjusting the voltage applied to the phase variable wave plate R1 so as to obtain a phase modulation of λ/4 for the wavelength λ focused on the optical disk 94 can convert each coupled light to circularly polarized light. The lights reflected by the optical disk 94 gain additional phase modulation of λ/4, thereby being converted to linearly polarized lights whose polarization directions are rotated by 90° from the incident lights. With the phase variable wave plate R1 as described above, the optical pickup that is provided with a plurality of light sources with different wavelengths can perform a servo operation and detect a reproducing signal in a stable manner with an optical detection system configured using a polarization branching member. Therefore, it is advantageous in a practical use.

The configuration shown in FIG. 14 uses a single liquid crystal layer, but using a phase variable wave plate R1b that includes two liquid crystal layers with different wavelength dispersion relationships of the refractive index can provide a still more practical device. The following is a description of the configuration thereof, with reference to FIGS. 15(a) and (b).

Specifically, this phase variable wave plate R1b includes a liquid crystal 124 containing tolans and a liquid crystal 123 mainly containing phenylcyclohexanes. As shown in FIGS. 15(a) and (b), the orientation directions thereof (shown with arrows) are perpendicular to each other (when no voltage is applied). The liquid crystal 124 containing tolans and the liquid crystal 123 mainly containing phenylcyclohexanes are respectively interposed between (polyimide-based) orientation films 122, ITO (InSnO$_x$) electrodes 121 and glass substrates 120.

Figure 16:
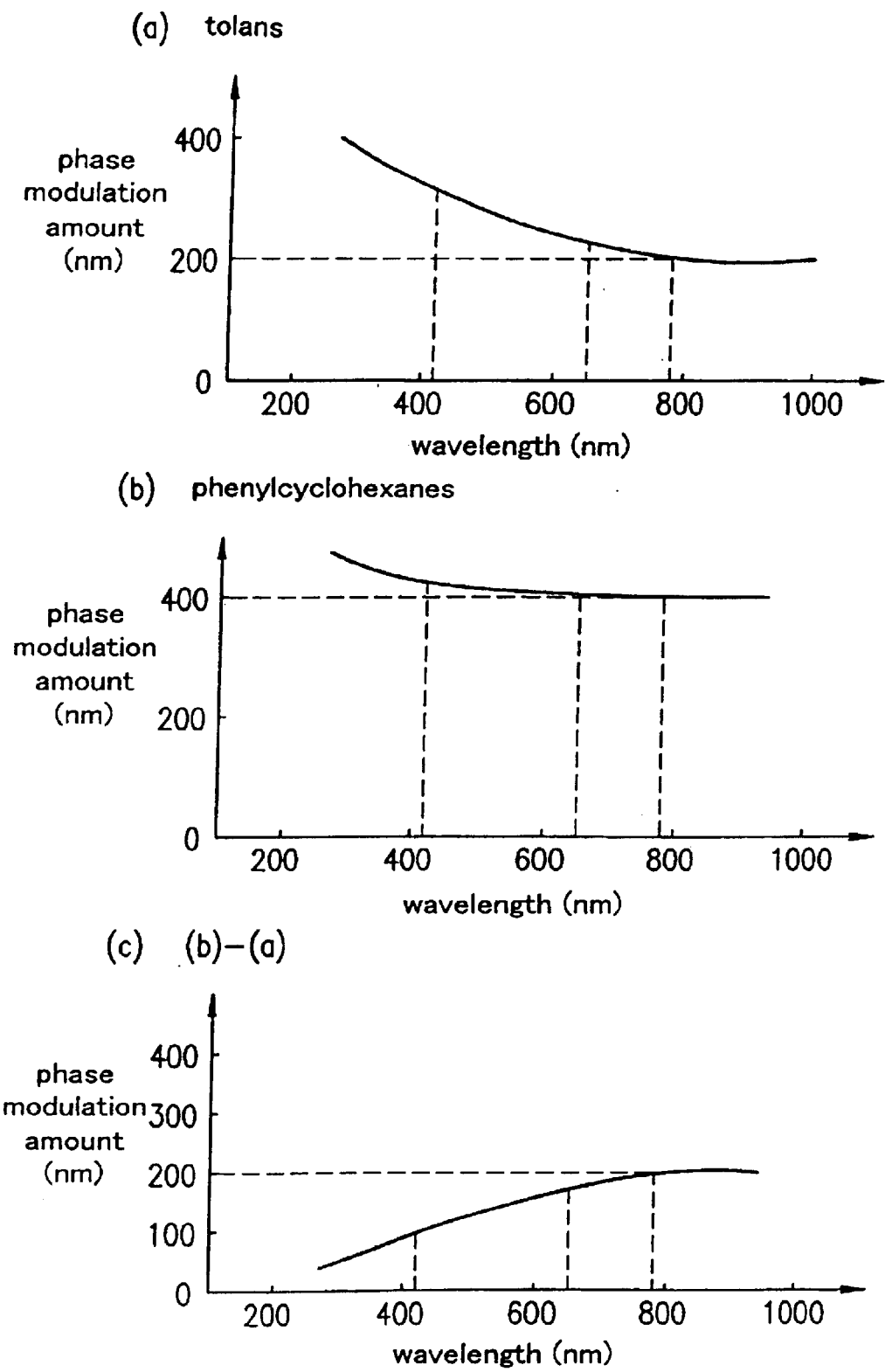
FIG. 16 is a graph for explaining an operation principle of the phase variable wave plate used in the optical pickup in accordance with the fourth embodiment of the present invention.

FIG. 16(a) shows a relationship between a wavelength and a phase modulation amount of the liquid crystal 124 containing tolans, and FIG. 16(b) shows that of the liquid crystal 123 mainly containing phenylcyclohexanes. As is shown in FIG. 16(a), the liquid crystal 124 containing tolans is a material with large wavelength dispersion, while, as is shown in FIG. 16(b), the liquid crystal 123 mainly containing phenylcyclohexanes is a material with small wavelength dispersion. The liquid crystal 123 mainly containing phenylcyclohexanes shown in FIG. 16(b) is twice as thick as the liquid crystal 124 containing tolans shown in FIG. 16(a).

By placing the two liquid crystals 123 and 124 so that retardant optical axes (axes C) thereof are perpendicular to each other, the axis C directions in which birefringence is generated are made perpendicular to each other. As a result, the phase modulation amount obtained by the combination of the two liquid crystals 123 and 124 is a difference between the birefringence amount generated by the liquid crystal 123 and that by the liquid crystal 124. Thus, setting the liquid crystal 123 mainly containing phenylcyclohexanes to be twice as thick as the liquid crystal 124 containing tolans achieves the wavelength dispersion properties shown in FIG. 16(c). This corresponds to the difference between the properties shown in FIG. 16(b) and that shown in FIG. 16(a).

In the present embodiment, the liquid crystal 124 containing tolans was set to have a thickness of 2 μm, and the liquid crystal 123 mainly containing phenylcyclohexanes was set to have a thickness of 4 μm, thereby obtaining phase differences of 200 nm for 780 nm wavelength light, 160 nm for 650 nm wavelength light, and 90 nm for 405 nm wavelength light. Thus, the phase variable wave plate R1b that functioned substantially as a 1/4 wave plate for each wavelength light could be obtained. In addition, since adjusting a voltage applied to the liquid crystal 123 mainly containing phenylcyclohexanes enables a fine adjustment of these properties, the phase variable wave plate R1b can function as a 1/4 wave plate in a stable manner even when an environmental temperature changes.

Figure 15:
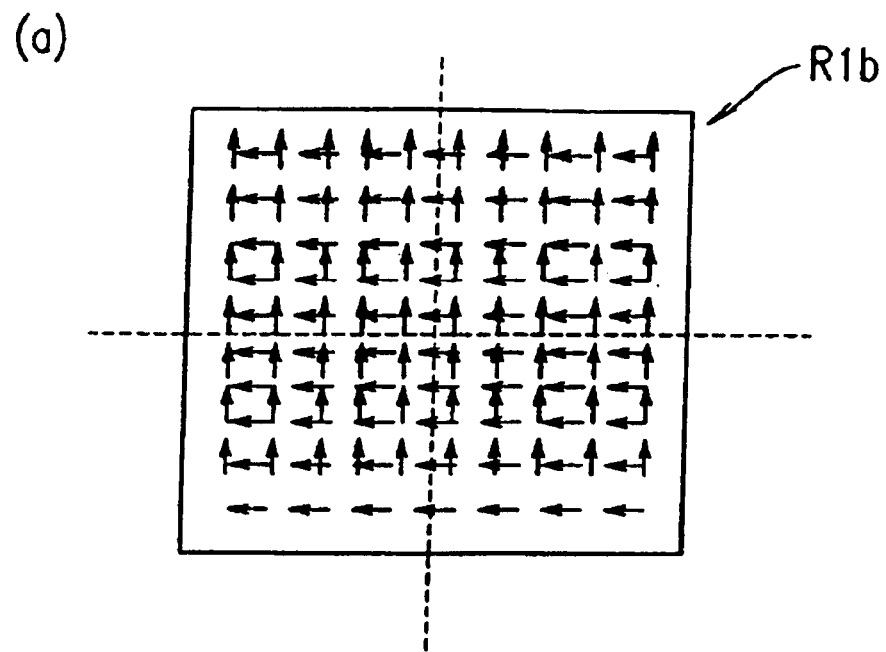
FIG. 15 shows a schematic diagram of a phase variable wave plate used in the optical pickup in accordance with the fourth embodiment of the present invention.
Figure 15:
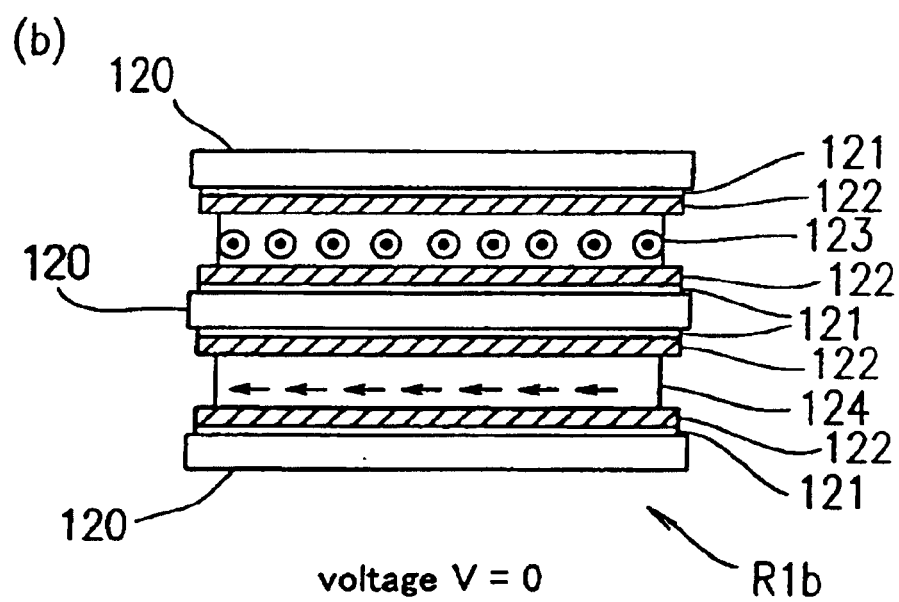
Figure 17:
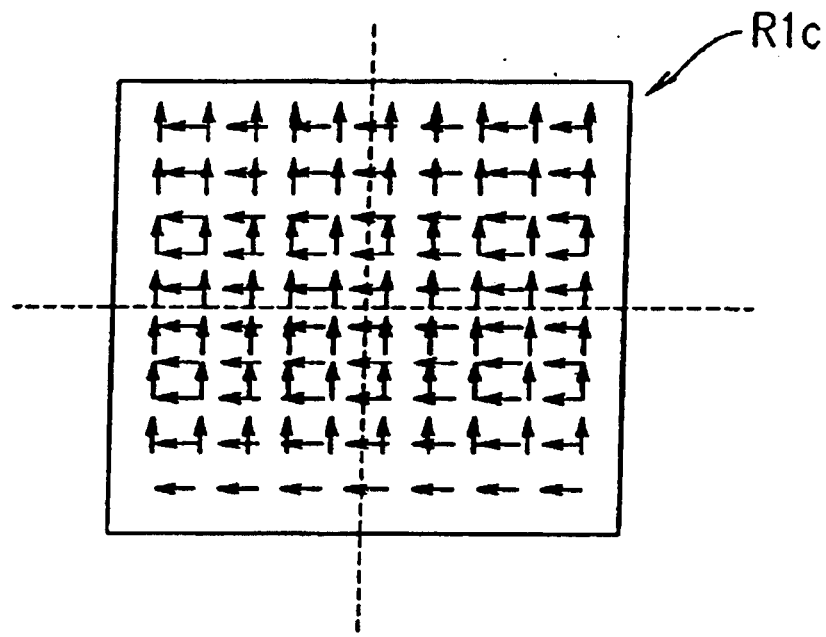
FIG. 17 shows a schematic diagram of another phase variable wave plate used in the optical pickup in accordance with the fourth embodiment of the present invention.
Figure 17:
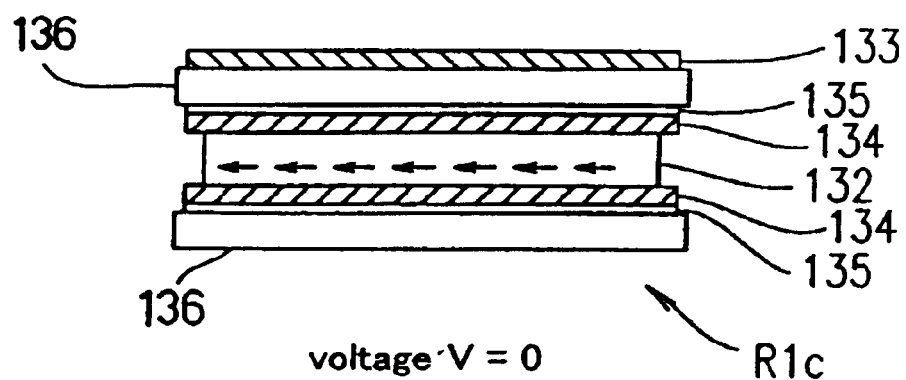

The phase variable wave plate R1b shown in FIG. 15 includes only liquid crystal layers, but using a phase variable wave plate R1c that includes a combination of a liquid crystal and a film having different wavelength dispersion relationships of the refractive index with each other, as shown in FIGS. 17(a) and (b), can achieve a still more practical optical pickup.

The phase variable wave plate R1c includes a combination of a liquid crystal 232 and a polyvinylalcohol-based film 133. The liquid crystal 232 is interposed between (polyimide-based) orientation films 134, ITO (InSnO$_x$) electrodes 135 and glass substrates 136. The polyvinylalcohol-based film 133 is formed on the glass substrate 136.

A material with large wavelength dispersion (for example, a liquid crystal containing tolans) is used as the liquid crystal 232, while a material with small wavelength dispersion is used as the polyvinylalcohol-based film 133. By placing the liquid crystal 232 and the polyvinylalcohol-based film 133 so that retardant phase axes (axes C) thereof are perpendicular to each other (when no voltage is applied), as shown with arrows in FIGS. 17(a) and (b), the axis C directions in which birefringence is generated are made perpendicular to each other. Thus, also in the phase variable wave plate R1c, a difference between the birefringence amount generated by the liquid crystal 232 and that by the polyvinylalcohol-based film 133 is the actual phase modulation amount.

Specifically, when setting the liquid crystal 232 to have a thickness of 2 μm, the phase modulation amount of 200 nm was obtained for 780 nm wavelength light, showing the wavelength dispersion relationship in FIG. 16(a). On the other hand, when setting the polyvinylalcohol-based film 133 to have a thickness of 100 μm, the phase change amount of 400 nm was obtained for 780 nm wavelength light, showing the wavelength dispersion relationship in FIG. 16(b). As a result, the obtained phase modulation amount showed the wavelength dispersion properties in FIG. 16(c). Thus, phase differences of 200 nm for 780 nm wavelength light, 160 nm for 650 nm wavelength light, and 90 nm for 405 nm wavelength light can be obtained, and the phase variable wave plate R1c that functions as substantially a 1/4 wave plate for each wavelength light can be obtained.

Since adjusting a voltage applied to the liquid crystal 232 enables a fine adjustment of the properties, the phase variable wave plate R1c can function as the 1/4 wave plate in a stable manner even when an environmental temperature changes.

When one of optical detection systems is configured using a polarization branching member, a conventional optical pickup that is provided with coherent light sources with different wavelengths cannot provide a servo operation and a signal detection in a stable manner unless a 1/4 wave plate is switched according to each wavelength light. On the contrary, as is described in the present embodiment, the configuration in which a phase variable wave plate including a liquid crystal layer is inserted in an optical pickup so as to control a phase modulation amount by adjusting an applying voltage enables a single phase variable wave plate to function as a 1/4 wave plate for every wavelength light, thereby achieving a stable signal detection, as well as a compatibility with other types of media. Therefore, it is advantageous in a practical use. In addition, a combination with a liquid crystal or a film having different wavelength dispersion relationships of the refractive index can reduce the voltage applied to the phase variable wave plate, thereby achieving a still more practical device.

Fifth Embodiment

In the fourth embodiment, the optical pickup and the optical information recording/reproducing apparatus using the phase variable wave plate R1, R1b or R1c that functions as a 1/4 wave plate for a plurality of lights with different wavelengths was described. In the present embodiment, an optical pickup and an optical information recording/reproducing apparatus using a phase variable wave plate in order to correct a birefringence amount generated in an optical disk will be described.

Figure 18:
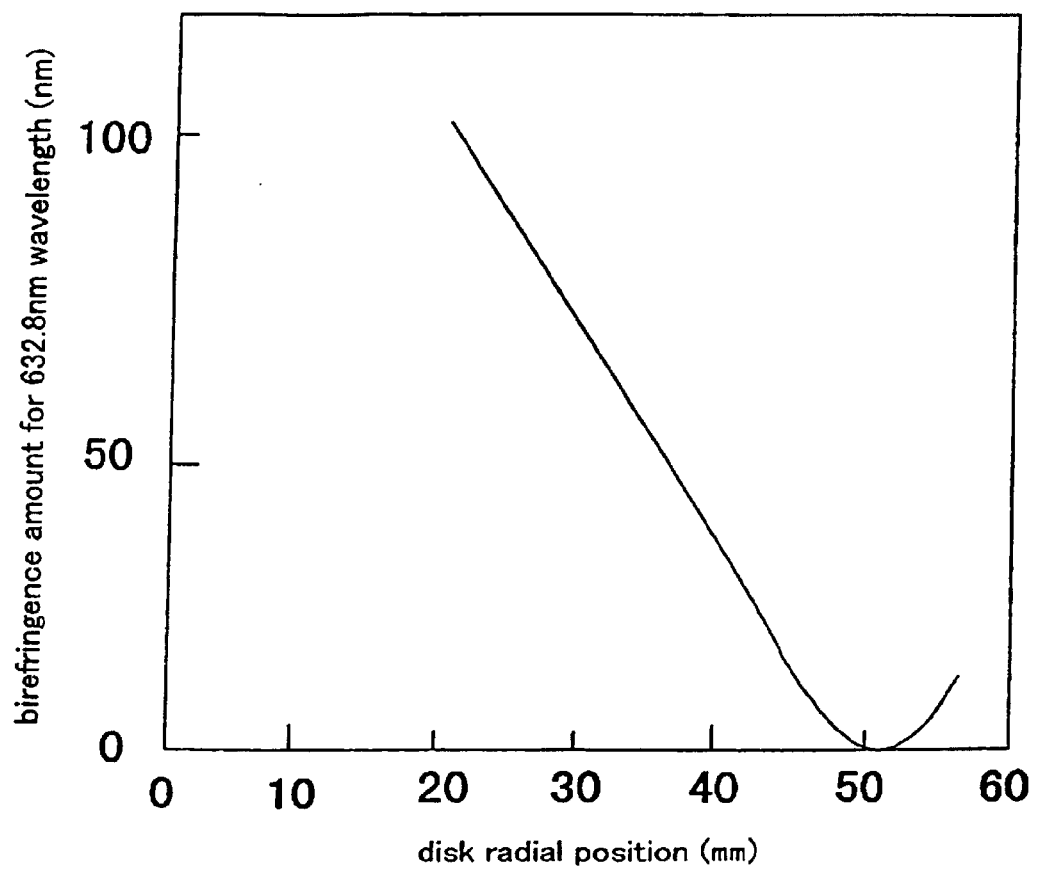
FIG. 18 is a graph showing birefringence of the optical disk.

Due to an anisotropy of refractive index generated during molding, polycarbonate used as a substrate of an optical disk becomes birefringent. FIG. 18 shows an example of the birefringence of the polycarbonate substrate for 632.8 nm wavelength. FIG. 18 indicates that the birefringence is large in an internal circumference direction of the optical disk. Therefore, about 100 nm of phase difference (approximately 1/4 wavelength of phase difference for 405 nm wavelength light) is generated between incident and return optical paths.

In the configuration using a polarizing hologram or a PBS (polarization beam splitter) in an optical detection system, since a 1/4 wave plate is located between the polarizing hologram or the PBS (polarization beam splitter) and an optical disk, the birefringence generated in the optical disk as is described above changes the light quantity guided onto a photo detector. On the contrary, the present embodiment uses a phase variable wave plate, thereby maintaining a constant light quantity guided onto the photo detector.

FIG. 19(a) shows a schematic diagram of the optical pickup in accordance with the present embodiment. FIG. 19(b) shows a schematic view illustrating the relationship between principal axes of birefringent crystal of a polarizing hologram and an optical disk and polarization directions of coherent light sources in the configuration of FIG. 19(a).

Figure 19:
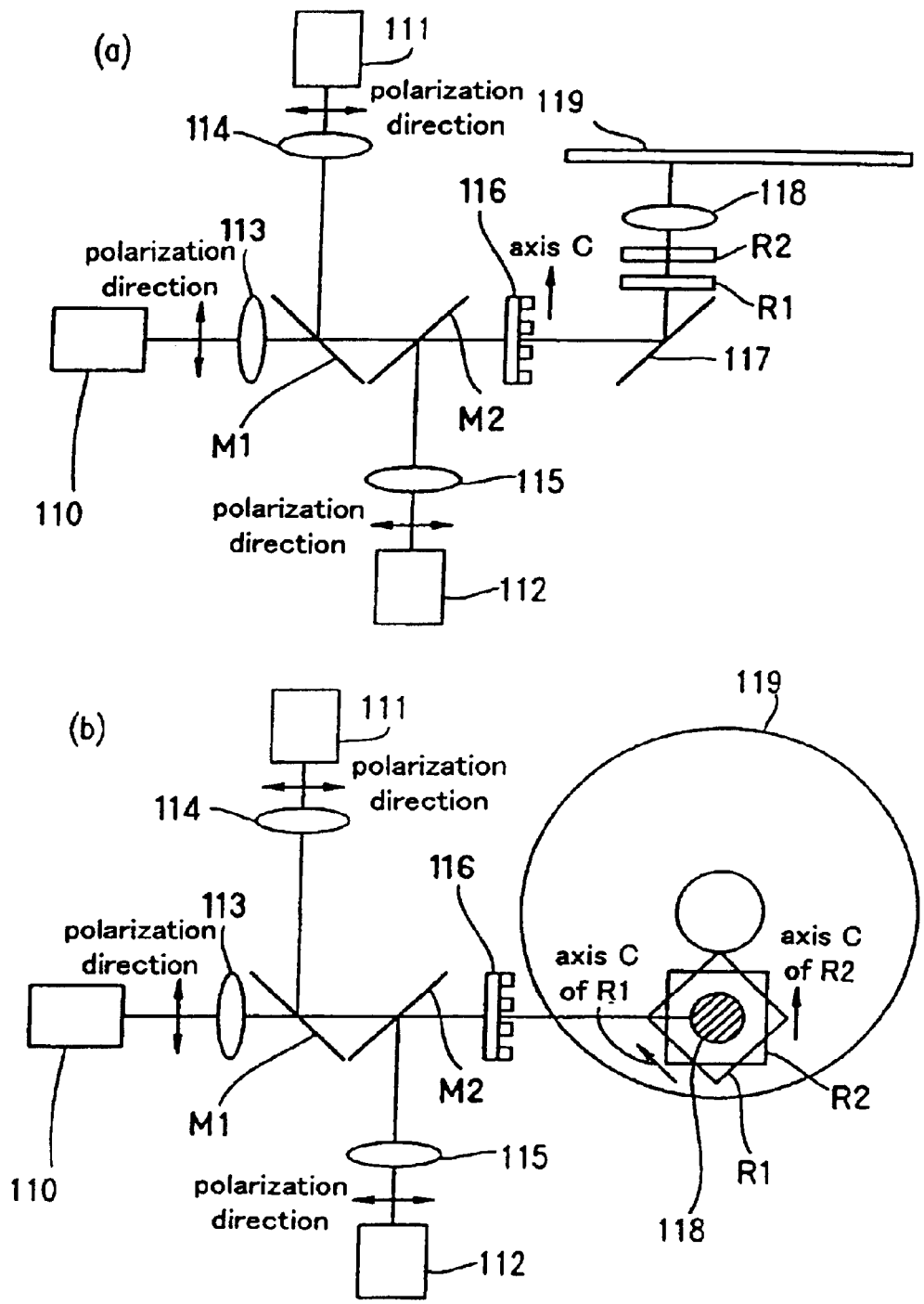
FIG. 19(*a*) shows a schematic diagram of an optical pickup in accordance with a fifth embodiment of the present invention, and FIG. 19(*b*) shows a schematic view illustrating the relationship between the principal axes of birefringent crystal of a polarizing hologram and an optical disk and polarization directions of coherent light sources in the configuration of FIG. 19(*a*).

In the configuration shown in FIG. 19, lights emitted from a GaN blue semiconductor laser unit 110 (wavelength of 405 nm) and an AlGaInP red semiconductor laser unit 111 (wavelength of 650 nm) are turned into parallel lights by collimator lenses 113 and 114 respectively and coupled by a dielectric multi-layer film mirror M1 so as to be propagated on the same optical axis. On the other hand, near infrared light with a wavelength of 790 nm emitted from an AlGaAs near infrared semiconductor laser unit 112 is turned into parallel light by a collimator lens 115 and reflected by a dielectric multi-layer film mirror M2. Thus, the three lights are coupled so as to be propagated on the same optical axis. The three lights coupled together pass through a polarizing hologram 116, are bent in the direction perpendicular to the face of the paper by a mirror 117 for bending an optical path (illustrated as being bent upward in FIG. 19(a)), pass through phase variable wave plates R1 and R2, and are focused on an optical disk 119 by an objective lens 118.

The phase variable wave plate R1 is disposed so that the axis C direction thereof is inclined by 45° with respect to the polarization direction of the coupled light and adjusted so as to function as a 1/4 wave plate for every wavelength light. The lights reflected by the optical disk 119 enter the phase variable wave plate R1 by which polarization directions thereof are rotated by 90° from the initial polarization directions, are diffracted by the polarizing hologram 116 and are guided to photo detectors integrated in the respective semiconductor laser units 110 to 112.

In the configuration shown in FIGS. 19(a) and (b), the phase variable wave plate R2 is disposed so that the axis C direction thereof is parallel to a radial direction of the optical disk 119, thus correcting the birefringence amount generated in the optical disk 119 by using the phase variable wave plate R2. Crystal axes are generated in directions parallel to and perpendicular to the radial direction of the optical disk 119. Therefore, locating a crystal axis of the phase variable wave plate R2 so as to be in parallel to the above-mentioned crystal axes, thereby correcting the birefringence amount generated in the optical disk 119. In this manner, even if large birefringence is generated in the optical disk 119, the phase variable wave plate R2 can rotate polarization directions of the reflected lights by 90° from those of the incident lights, thereby maintaining a constant light quantity guided onto the photo detector integrated in respective laser units 110 to 112. In other words, the phase variable wave plate R2 adjusts its phase difference so that the sum of retardation amounts generated in the phase variable wave plate R1 and the optical disk 119 functions as a 1/4 wave plate for the wavelength of the incident light, namely, the largest light quantity is guided onto the photo detector.

For example, when reproducing with blue light, the voltage applied to the phase variable wave plate R1 is adjusted so that it functions as a 1/4 wave plate for 405 nm wavelength light, and the voltage applied to the phase variable wave plate R2 is adjusted so that a constant light quantity is guided onto the photo detector. In this manner, even if the birefringence amounts vary with the optical disks 119, stable servo operation and reproduction can be performed.

In particular, the birefringence amount of the blue region is large due to a wavelength dispersion relationship. Moreover, shorter wavelength causes larger phase modulation amount. Thus, as is described in the present embodiment, the optical pickup that is provided with the phase variable wave plate R2 for compensating for the birefringence generated in the optical disk 119 is advantageous in a practical use. In addition, since the phase modulation amount generated due to the birefringence of the optical disk 119 varies according to the wavelength, the optical pickup that is provided with coherent light sources with different wavelengths is especially effective.

Sixth Embodiment

FIG. 20(a) shows a schematic diagram of an optical pickup with a united phase variable wave plate in accordance with the present embodiment. FIG. 20(b) shows a schematic view illustrating the relationship between principal axes of birefringent crystal of a polarizing hologram and an optical disk and polarization directions of coherent light sources in the configuration of FIG. 20(a).

In the configuration shown in FIG. 20(b), an optical pickup and an optical disk 109 are disposed to be inclined by 45° with respect to each other. Therefore, a principal crystal axis (axis C) of the phase variable wave plate R3 is in parallel to a radial direction in a substrate of the optical disk 109. Accordingly, a single phase variable wave plate R3 has functions both as a 1/4 wave plate and of compensating for a birefringence amount generated in the optical disk 109. With the phase variable wave plate R3 as described above, the optical pickup that is provided with coherent light sources with different wavelengths can perform a servo operation and detect a reproducing signal in a stable manner with an optical detection system configured using a polarization branching member. In addition, the phase variable wave plate R3 can simplify the optical pickup and reduce power consumption as well as compensate for the birefringence of the optical disk. Therefore, it is advantageous in a practical use. When the principal crystal axis (axis C) of the phase variable wave plate R3 is perpendicular to the radial direction in the substrate of the optical disk 109, the similar effect can be achieved.

When the optical disk 109 is birefringent, the sum of phase modulations of the phase variable wave plate R3 and the optical disk 109 is a total phase modulation. Therefore, when the optical disk 109 has a large phase modulation of λ/4, the total phase difference of λ/2 is generated. Since this causes the phase difference of λ between incident and return lights, no light quantity is guided onto the photo detector when using a polarizing optical detection system. On the contrary, in the present embodiment, since the single phase variable wave plate R3 has both functions as the 1/4 wave plate and of compensating for the birefringence amount generated in the optical disk 109, the light quantity guided onto the photo detector does not become zero even when using the polarizing optical detection system.

The configuration of the present embodiment also uses dielectric multi-layer film mirrors M1 and M2, which is similar to those shown in FIGS. 9, 13 and 19. These dielectric multi-layer film mirrors M1 and M2 show the same transmitting properties for both P wave and S wave in every wavelength light.

Figure 20:
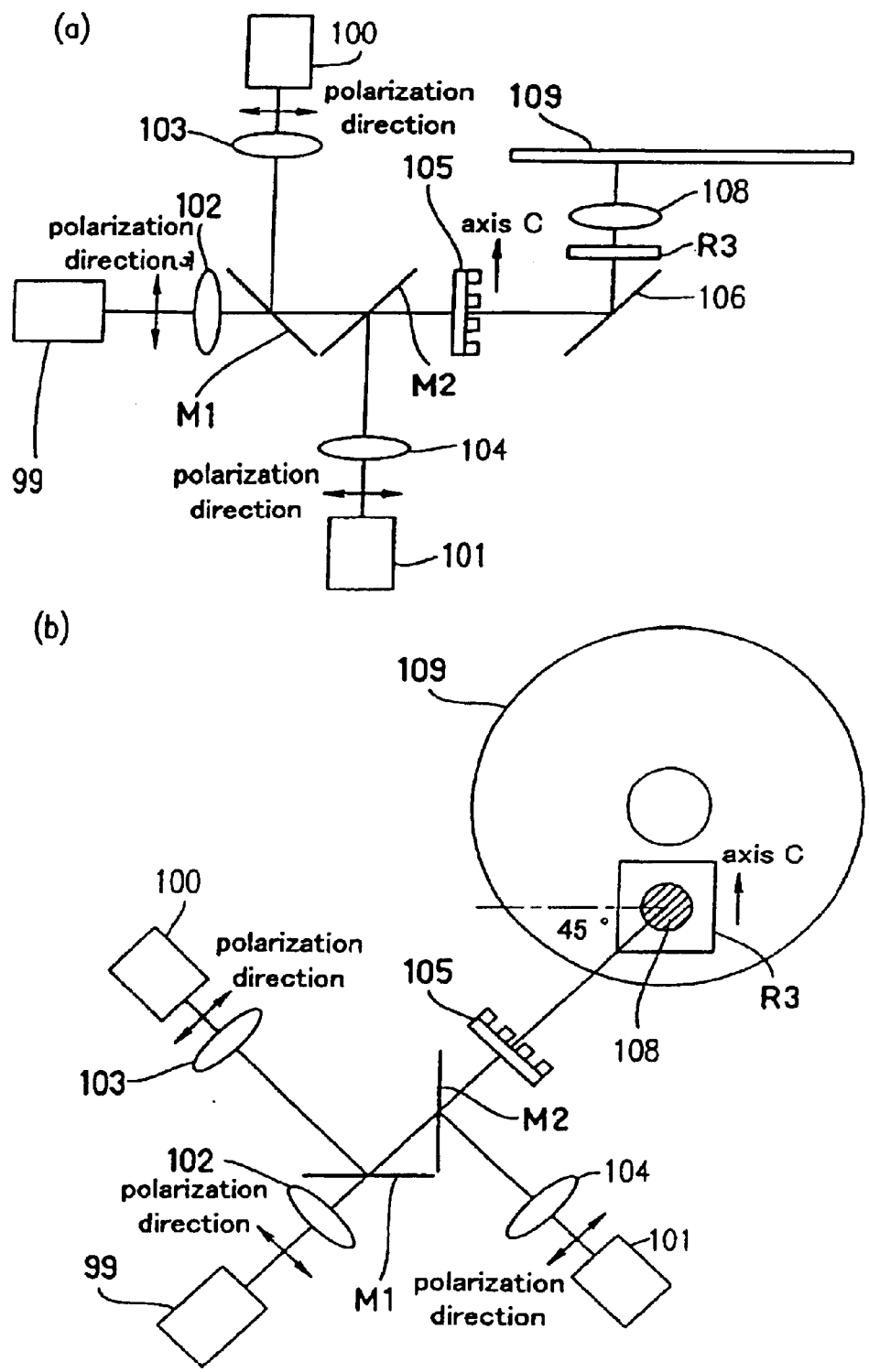
FIG. 20(*a*) shows a schematic diagram of an optical pickup in accordance with a sixth embodiment of the present invention, and FIG. 20(*b*) shows a schematic view illustrating the relationship between principal axes of birefringent crystal of a polarizing hologram and an optical disk and polarization directions of coherent light sources in the configuration of FIG. 20(*a*).
Figure 21:
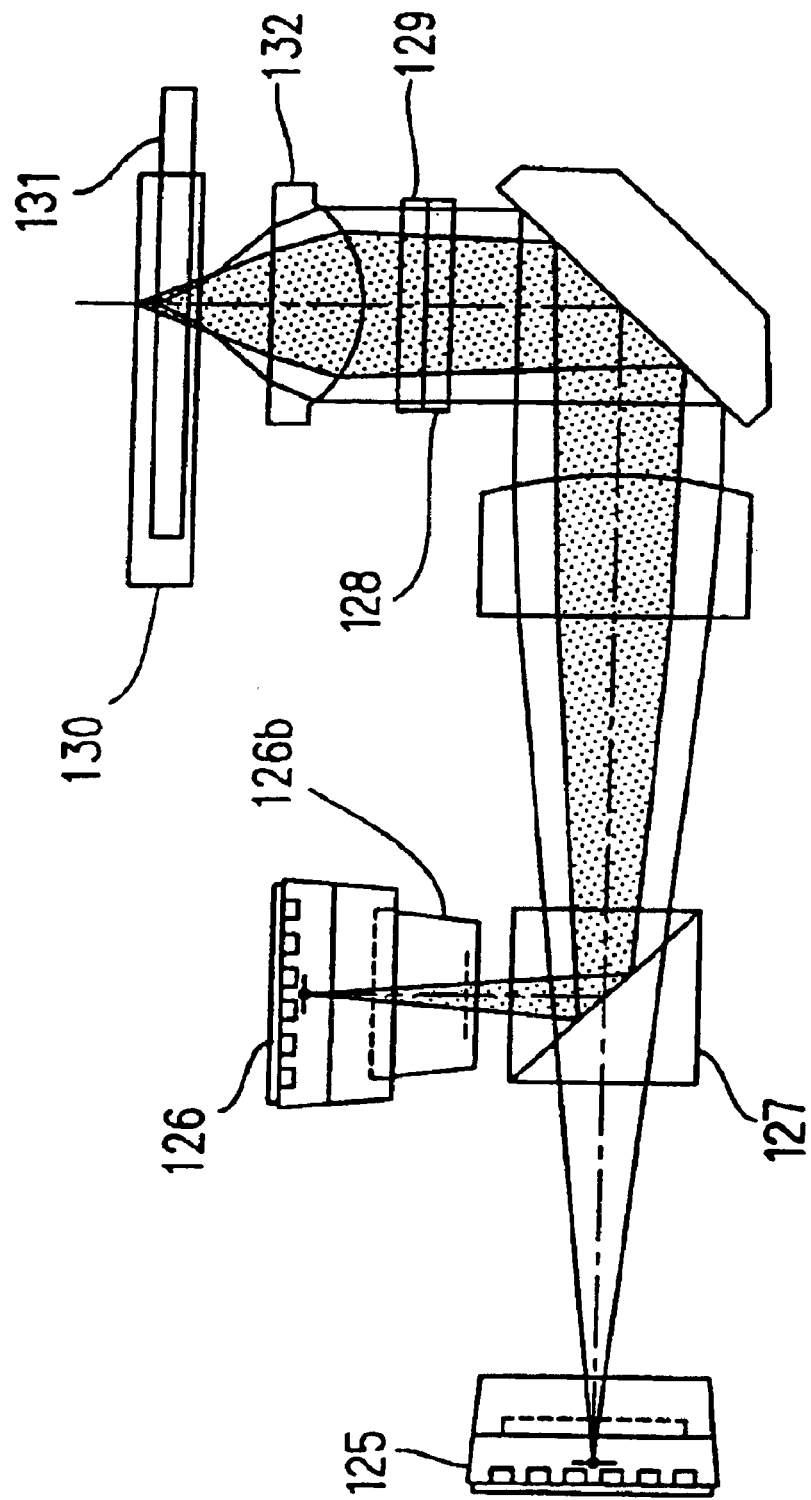
FIG. 21 shows a schematic diagram of a conventional optical pickup provided with semiconductor lasers of two wavelengths.

In the configuration shown in FIG. 20, lights emitted from a GaN blue semiconductor laser unit 99 (wavelength of 405 nm) and an AlGaInP red semiconductor laser unit 100 (wavelength of 650 nm) are turned into parallel lights by collimator lenses 102 and 103 respectively and coupled by the dielectric multi-layer film mirror M1 so as to be propagated on the same optical axis. On the other hand, near infrared light with a wavelength of 790 nm emitted from an AlGaAs near infrared semiconductor laser unit 101 is turned into parallel light by a collimator lens 104 and reflected by the dielectric multi-layer film mirror M2. Thus, the three lights are coupled so as to be propagated on the same optical axis. The three lights coupled together pass through a polarizing hologram 105, are bent in the direction perpendicular to the face of the paper by a mirror 106 for bending an optical path (illustrated as being bent upward in FIG. 20(a)), pass through phase variable wave plates R3, and are focused on an optical disk 109 by an objective lens 108.

The lights reflected by the optical disk 109 pass the objective lens 108, the phase variable wave plate R3 and the mirror 106 for bending the optical path again, are diffracted by the polarizing hologram 105 and are guided onto photo detectors integrated in the respective laser units 99 to 101.

In the configuration of the optical pickup in accordance with the present embodiment, the polarization directions of the coupled lights are inclined by 45° with respect to the radial direction of the optical disk 109, and the principal crystal axis (axis C) of the phase variable wave plate R3 and the radial direction of the optical disk 109 are in parallel to each other. Therefore, the polarization directions of lights emitted as linearly polarized lights are inclined by 45° with respect to the principal crystal axis (axis C) of the phase variable wave plate R3. Accordingly, the phase variable wave plate R3 can function as a 1/4 wave plate. In addition, the birefringence amount is generated in the optical disk 109 in the radial direction, which is in parallel to the principal crystal axis (axis C) of the phase variable wave plate R3. Consequently, the phase variable wave plate R3 can compensate for the birefringence amount generated in the optical disk 109.

In the present embodiment, the optical detection systems are configured by using the polarizing hologram 105 for every wavelength light. Therefore, the phase variable wave plate R3 has to be adjusted so as to function as a 1/4 wave plate for every wavelength light. The light emitted from the coherent light source enters the polarizing hologram 105 in an extraordinary light direction as a linearly polarized light. Since the polarizing hologram 105 does not sense the change of the refractive index for light in the extraordinary light direction, the incident light is not diffracted. By controlling the sum of the phase modulation of the phase variable wave plate R3 and that generated in the optical disk 109 for incident path so as to be np/4 (np/2 for both incident and return paths) (n=1, 3, 5, 7, . . . ), the light reflected by the optical disk 109 passes through the phase variable wave plate R3 and then is converted to a linearly polarized light whose polarization direction is rotated by 90° from the initial polarization direction.

In other words, the phase modulations are controlled so that the largest light quantity is guided onto the photo detectors that are integrated in the respective laser units 99 to 101, thereby achieving a stable servo operation and a signal detection.

The present embodiment has described the optical pickup that is provided with light sources respectively emitting lights with three wavelength regions, but the optical pickup that is provided with light sources respectively emitting lights with two wavelength regions can achieve the similar effect. In particular, since birefringence amount of an optical disk is large in a short wavelength region, an optical pickup that is provided with light sources with short wavelengths is especially effective.

In the present embodiment, using the phase variable wave plate that includes two liquid crystal layers with different wavelength dispersion relationships of the refractive index, as is described in the fourth embodiment, can provide a still more practical device. In this case, since adjusting respective voltages applied to a liquid crystal containing tolans and a liquid crystal mainly containing phenylcyclohexanes enables a fine adjustment of properties, the phase variable wave plate can function as a 1/4 wave plate in a stable manner even when an environmental temperature changes.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical pickup comprising:

two coherent light sources respectively emitting light beams with different wavelengths ($\lambda_1 < \lambda_2$);

a light coupling member; and a wave plate;

wherein the light beams emitted from said two coherent light sources are coupled by said light coupling member so as to be propagated on the same optical axis, pass through said wave plate, and then are focused on an optical disk, and a retardation amount $\lambda$ of said wave plate is in the range $3/4 \cdot \lambda_2 < \lambda < 5/4 \cdot \lambda_1$.

2. The optical pickup according to claim 1, wherein the wavelengths of said two coherent light sources are in the ranges 370 nm < $\lambda_1$ < 430 nm and 635 nm < $\lambda_2$ < 690 nm.

3. The optical pickup according to claim 1, wherein said light coupling member is a dielectric multi-layer film mirror.

4. The optical pickup according to claim 1, wherein the optical pickup further comprises:

a variable phase plate that is divided into regions of concentric rings and inserted in an optical path between said coherent light source and said optical disk; and an objective lens for focusing the light beams with the different wavelengths emitted from said coherent light sources on said optical disk;

wherein said variable phase plate compensates for spherical aberration caused by said objective lens.

* * * * *